United States Patent [19]

Pugh et al.

[11] Patent Number: 5,483,582
[45] Date of Patent: * Jan. 9, 1996

[54] APPLICATIONS PLATFORM FOR A TELEPHONE SYSTEM GATEWAY INTERFACE

[75] Inventors: Joel A. Pugh; Douglas E. Neel; Kenneth J. Piercy, all of Dallas, Tex.

[73] Assignee: Messager Partners, Dallas, Tex.

[*] Notice: The portion of the term of this patent subsequent to Oct. 6, 2009, has been disclaimed.

[21] Appl. No.: 952,925

[22] Filed: Sep. 28, 1992

Related U.S. Application Data

[63] Continuation-in-part of Ser. No. 806,117, Dec. 12, 1991, Pat. No. 5,153,907.

[51] Int. Cl.6 .................... H04M 17/00; H04M 15/00
[52] U.S. Cl. .................. 379/144; 379/155; 379/220; 379/112; 379/114
[58] Field of Search .................... 379/112, 114, 379/143, 144, 207, 209, 213, 214, 220, 155, 223

[56] References Cited

U.S. PATENT DOCUMENTS

| | | |
|---|---|---|
| 4,160,129 | 7/1979 | Peyser et al. . |
| 4,594,477 | 6/1986 | Noirot . |
| 4,661,974 | 4/1987 | Bales et al. . |
| 4,777,647 | 10/1988 | Smith et al. . |
| 4,791,665 | 12/1988 | Bogart et al. . |
| 4,825,460 | 4/1989 | Carter et al. . |
| 4,873,718 | 10/1989 | Barnett et al. . |
| 4,897,870 | 1/1990 | Golden . |
| 4,907,257 | 3/1990 | Asano ........................ 379/144 |
| 4,907,258 | 3/1990 | Kamitomo . |
| 4,908,852 | 3/1990 | Hird et al. . |
| 4,920,562 | 4/1990 | Hird et al. ................. 379/144 |
| 4,924,497 | 5/1990 | Smith et al. . |
| 4,933,965 | 6/1990 | Hird et al. . |
| 4,933,966 | 6/1990 | Hird et al. . |
| 4,974,257 | 11/1990 | Ibanez et al. ............... 379/144 |
| 4,975,941 | 12/1990 | Morganstein et al. ....... 379/212 |
| 5,046,183 | 9/1991 | Dorst et al. ................ 379/144 |
| 5,068,891 | 11/1991 | Marshall .................... 379/144 |
| 5,134,646 | 7/1992 | Carlson ...................... 379/145 |
| 5,153,907 | 10/1992 | Pugh et al. .................. 379/143 |
| 5,157,717 | 10/1992 | Hitchcock .................. 379/144 |
| 5,163,086 | 11/1992 | Ahearn et al. .............. 379/144 |
| 5,210,789 | 5/1993 | Jeffus ........................ 379/223 |
| 5,223,699 | 6/1993 | Flynn et al. ................ 379/144 |
| 5,266,782 | 11/1993 | Alanara ..................... 379/144 |

Primary Examiner—Stephen Chin
Assistant Examiner—Paul Loomis
Attorney, Agent, or Firm—Haynes and Boone

[57] ABSTRACT

A system is disclosed for providing enhanced call service and call routing functions from a centralized location on a telephone network line through gateway connections to service providers. A multiple function interface located between a paystation and an originating central office includes a monitoring circuit for monitoring call signals from the paystation, circuits for obtaining coin or card billing information from the paystation and a control circuit for verifying the payment information and selectively directing the call to a service provider to bypass the originating central office. The interface uses an applications platform to communicate with the network and data bases. The platform assists in operations, maintains files and records, and functions as a communications protocol converter for the interface. The platform enables calling customer service preferences to be acertained automatically during call set-up upon receipt of billing information.

35 Claims, 14 Drawing Sheets

APPLICATIONS PLATFORM FOR A TELEPHONE SYSTEM GATEWAY INTERFACE

CROSS REFERENCE TO RELATED APPLICATION

This application is a continuation-in-part of U.S. application Ser. No. 07/806,117 filed Dec. 12, 1991, issued Oct. 6, 1992 as U.S. Pat. No. 5,153,907.

FIELD OF THE INVENTION

The invention relates generally to telecommunications systems and particularly to an applications platform adjacent to an intelligent gateway interface located on the line between the calling station and the originating central office of a telecommunications network for performing selected call service and call routing functions.

BACKGROUND OF THE INVENTION

Deregulation of the telecommunications industry has led to private ownership of telephone paystation and switching system technology resulting in competition to capture revenue among contending providers of both local and long distance call services. Both coin collection and credit billing from users of paystations are important sources of such revenue. The ability of a paystation owner to capture this revenue has been facilitated with the development of intelligent or so-called "smart" paystations capable of operating on a conventional telephone business line. Such paystations typically include their own microprocessor and associated memory for supporting various computer programs to perform functions which otherwise would be performed in a central office. The computer programs are able to provide enhanced services to both the user and call service provider which enable cost reduction and increased profitability at the paystation. Examples of enhanced services generally include automated operator services and other services such as automatic message delivery. Also, associated memory of the intelligent paystation can be used to store rate information for various long distance carriers.

Although intelligent paystations are advantageous, the use of other specialized telecommunication services and equipment are still required in the provision of local and long distance telephone call services from a paystation. Typically, a multiple paystation installation is connected via class-marked trunks, leased lines or standard business lines to a local telephone operating company central office. Each local telephone operating company operates within a so-called local access and transport area (LATA). Local calls are directed by the central office to the destination within the LATA. Long distance calls are carried between distant local telephone operating companies through the AT&T network or through one or more independent interexchange carriers (IXCs). When a long distance call is dialed, the call is usually transmitted through an operating company central office to a point of presence (POP) in the originating LATA at which it is picked up by the interexchange carrier and passed by that carrier on to a point of presence in a distant LATA. Upon reaching the destination LATA, the call is then transferred by the interexchange carrier to the local telephone operating company central office within that LATA for ultimate connection to the called station therein. Typically, the points of presence in each LATA include suitable switching circuits, e.g., an access tandem, that are interconnected by a digital serial link. Such a digital serial link is used to interconnect most central offices as well as to interconnect operating company switching networks to other types of switches, such as the cell site control switches of a mobile telephone network.

Accordingly, local telephone operating companies and other service providers typically participate in revenue generated from private paystations for their services and equipment utilized to complete a call. This participation is significant for those services which the paystation owner is unable to offer as well as for those services the owner does not choose to offer. For example, calls paid for by coin in advance of transmission from a paystation, referred to as coin calls or "sent paid" traffic, require intelligent coin signalling and accounting which can be handled either at an intelligent paystation or otherwise at a central office for a fee. A limitation of intelligent paystations is their inability to interface directly with the rate table data base of individual interexchange carriers to facilitate the delivery of sent paid calls through the individual carriers. Rate information updates therefore require changes to data stored in each paystation location. A limitation of local telephone operating company central offices is that they typically do not offer interexchange carriers equal access to sent paid traffic from paystation installations.

Also, automated operator services are provided both from intelligent paystations and from central office locations. Automated operator services enable collection of revenue from a paystation for completion of a collect call, a call billed to a credit card or account number, or a call placed using a variety of other billing access formats. Further, other enhanced services such as automatic message delivery are capable of being performed either from a central office or an intelligent paystation.

However, there are limitations associated with providing the foregoing services at either the paystation or the central office. A limitation of providing enhanced services from a central office is that new services are not easily incorporated into the switch circuitry of the central office. The central office switch circuitry typically controls up to ten thousand lines and outbound links to multiple local central offices. Further, to interface the incoming lines to outgoing interexchange carriers, instructions such as Feature Group D routing information must be immediately accessed by the switch circuitry. Programming for controlling the switch functions is extremely complex and is not easily modified. Disfunctioning program modifications create a potential for rendering the switch circuitry inoperable.

A limitation of providing the foregoing services from a multiple paystation installation is the hardware cost associated with building each intelligent paystation or refurbishing existing standard ("dumb") paystations to incorporate the necessary intelligence. Further, multiple intelligent paystations are not readily modified to incorporate new services nor are they easily controlled to select the particular services for deployment in individual paystations. Intelligent paystations are also limited in that they typically do not offer caller access to other enhanced service providers.

A further disadvantage of existing equipment is the inability of the network to automatically select a preferred service provider upon caller entry of billing information.

SUMMARY OF THE INVENTION

The foregoing problems are solved and a technical advance is achieved by a method and apparatus of the present invention which enables enhanced call services and call routing functions to be performed from a centralized location on a telephone network line through gateway connections to service providers. In a departure from the art, a multiple function interface is provided between a calling station and an originating central office in the telephone network, in which an originating call is monitored, call payment (coin or billing) information is validated and the call is delivered as a "1+" call to either the originating central office, or is selectively redirected to alternate carriers or service providers.

The functions of the interface are controlled by preprogrammed instructions and by instructions from the calling station. The interface provides enhanced call services in conjunction with standard or intelligent paystations and adjunct applications platforms on various call types from the calling station. The interface enables communication with intelligent paystations and adjunct platforms utilizing a unique protocol for selectively controlling these elements in the provision of call services.

In an illustrative embodiment, the interface is connected between a calling station and an originating central office switch in a telecommunication circuit for providing call connections to at least one other service provider. The interface includes means connected to the circuit for monitoring the circuit for signals from the calling station and means responsive to the receipt of signals from the calling station for obtaining payment information from the calling station. For example, the payment information may be coin deposit, card billing, or other types of prepaid or debit card information. The interface further includes means for verifying the payment information and means responsive to the verification for selectively redirecting the call directly to the other service provider to bypass the originating central office. The call is redirected according to the content of the billing information so it is routed to the desired other service provider.

In one embodiment, the interface also includes a system bus and first and second interface circuits for respectively connecting the calling station and the other service providers to the bus. The means for directing the call controls the coupling of the first and second interface circuits on the bus in order to effect communication between the calling station and the service provider. In one aspect, the first interface circuit includes a coin line interface circuit for connecting the bus to the calling station via a coin line, and a business line interface circuit for connecting the bus to the calling station via a business line. The second interface circuit similarly connects the bus to the other service providers, and also includes a link interface circuit for connecting the bus to the other service providers via a digital communications link.

In another aspect, an interface of the invention facilitates the routing of sent paid (coin) calls from a paystation. The interface includes means for monitoring the calling station and receiving signals indicative of the call destination and also coin deposit information, means for verifying the coin deposit information, and means for transmitting the destination information as a direct call to any service provider to complete the call. The direct call is placed as a "1+" call from the interface to any interexchange carrier, for example. Alternatively, the interexchange carrier can be direct dialed using a 10XXX equal access code.

In yet another aspect, an interface of the invention includes means for providing enhanced call services to the calling station from the interface itself or in conjunction with an adjunct applications platform. The enhanced services include an automatic call back service in which an unsuccessfully completed call from the original calling station is subsequently automatically placed to the original calling station from the enhanced service provider. Upon completion of the subsequently placed call to the original called station, the call is initiated back to the original calling station for completion between the original calling and called parties.

In yet another aspect, the present invention provides a communications protocol for selectively controlling the offering of services between an intelligent paystation and an interface connected between the paystation and an originating central office. The protocol includes means for monitoring call conditions which require call services, means for determining which of the paystation and the interface are capable of offering the service, and means for selecting which of a capable paystation and a capable interface will provide the service, based upon a predetermined preference.

The interface, through the communications with the paystation, can interact with a variety of card readers, including magnetic stripe, debit and credit cards, and other technologically advanced cards.

In yet another aspect of the invention, the interface uses an applications platform to communicate with the network and data bases in an X.25 or a Common Channel Signalling System #7 (SS7) environment. The applications platform is used to assist in operations, maintain files and records, and functions as a communications protocol converter for the interface, allowing the interface additional functionality and communications with additional alternative processors and databases.

A technical advantage achieved with the present invention is its universal application to connect both coin and business line paystations to different originating central offices regardless of the line conditioning or programming required for the switch circuitry of the particular central office.

A further technical advantage achieved with the invention is the ability to handle coin control functions independent of functions at the originating central office for the selective rerouting of sent paid long distance calls to alternative carriers.

A further technical advantage achieved with the invention is the ability to distinguish between various types of billing card formats and reroute calls to different long distance carriers accordingly.

A further technical advantage achieved with the invention is the ability to accept various forms of credit and debit cards.

A further technical advantage achieved with the invention is the ability to communicate with remote data bases to ascertain a calling customer's service preferences during the call set-up sequence (in real time) and to transfer the call, along with any ascertained billing and other call data, to the preferred service provider. This eliminates the need for the calling customer to repeat the entry of any information.

A further technical advantage achieved with the present invention is that it offers versatility in the provision of enhanced services from multiple enhanced service providers and the ability to provide those services from multiple locations.

A further technical advantage achieved with the invention is the ability to selectively block inappropriately dialed or fraudulent calls by monitoring digits dialed and preventing retransmission to a destination without a verification of billing information.

DETAILED DESCRIPTION OF THE INVENTION

Figure 1:
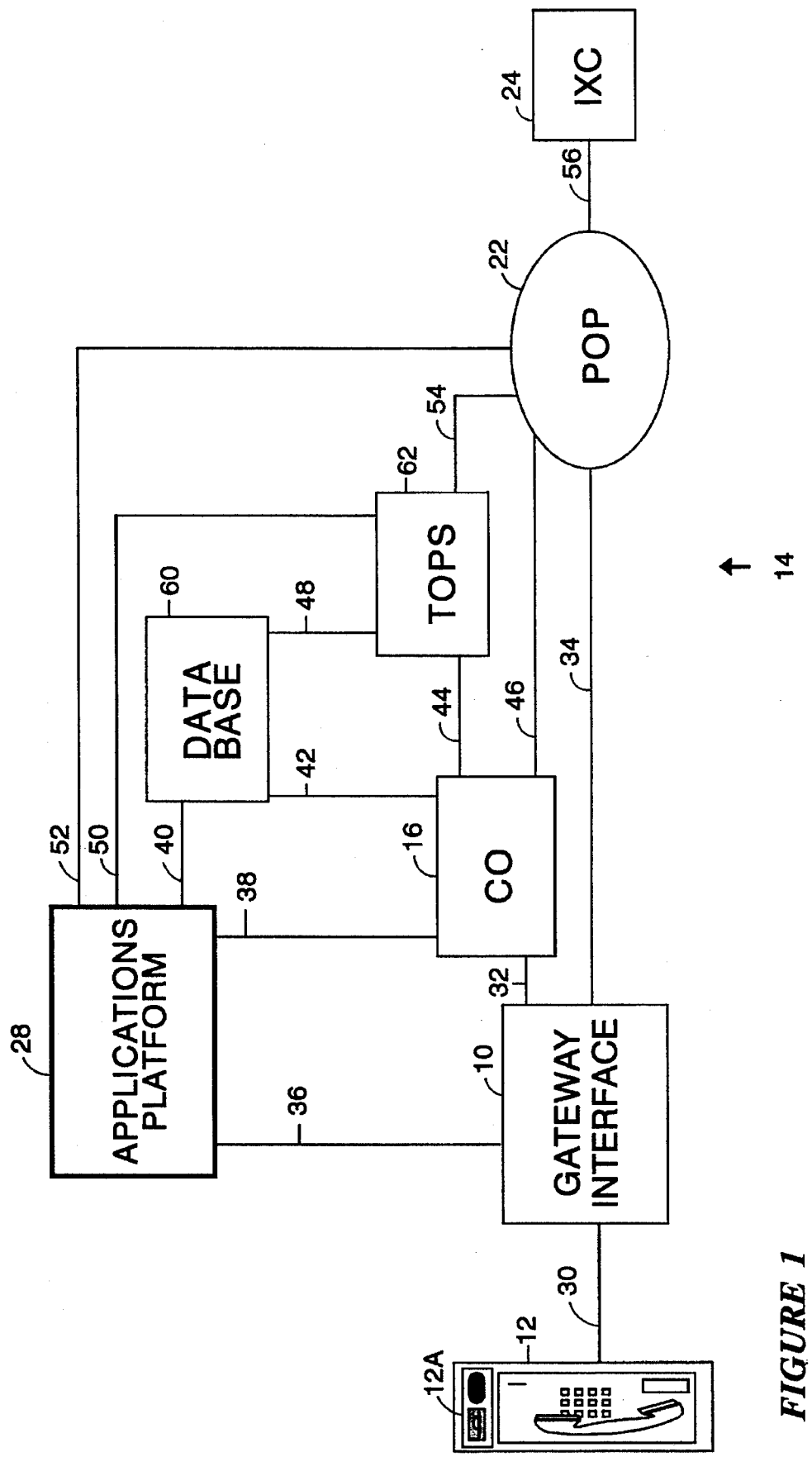
FIG. 1 is a functional block diagram illustrating the use of an interface and an applications platform between a paystation telephone and a telephone network.

In FIG. 1, the interface 10 of the present invention is shown connected between a telephone paystation 12 and the public-switched network, generally designated by the reference numeral 14. The paystation 12 is either a standard ("dumb") paystation or an intelligent paystation. The network 14 includes a local switch or central office 16 for completing calls through a distant central office (not shown) to subscribers of destination telephone stations (not shown). Each of the central offices operate within its own local access and transport area (LATA) for receiving and delivering calls.

Long distance calls are usually completed by transmitting the call from the paystation 12 through the central office 16, for example, to a termination point in the originating LATA referred to as a "point of presence" (POP) 22, at which the call is picked up by a tandem switching office of the public or a private interexchange carrier (IXC) 24. It is understood that a number of different IXCs 24 may be available to deliver a call. As is conventional, the facilities of an alternative IXC 24 can be accessed according to a specific authorization code entitling the user to complete a communication path through a facility of the IXC 24 to the destination. While not shown, it is understood that facilities of distant IXCs 24 are interconnected by long distance trunks or microwave transmission mediums. When the long distance call reaches a point of presence (POP) of the destination LATA (not shown), it is transferred to the destination local central office (not shown) for delivery to the called party at a subscriber station (not shown).

In a departure from the art, the interface 10 operates as a gateway to selectively route calls from the paystation 12 to either the central office 16, to the IXC 24 (through the POP 22) or to an applications platform (AP) 28, described below. It is understood that optimally, the interface 10 is connected directly to the CO 16, IXC 24 or the AP 28, although alternatively, the interface 10 may connect to various points in the network in order to perform the call routing. A line 30 connects the interface 10 to the paystation 12. The line 30 is a standard analog (coin) line for a standard paystation 12 or is a nonclass-marked (business) line for an intelligent paystation 12. A line 32 connects the interface 10 to the central office 16. The line 32 is a standard analog line or a nonclass-marked line, although it may alternatively be a digital communications link. It is understood that the interface 10 is installed in the central office 16, although it may be placed in any location on the line between the paystation 12 and the originating central office 16. Digital communications links 34 and 36 connect the interface 10 to the POP 22 and to the platform 28, respectively. The links 34, 36 are preferably high speed TSPAN (T1SF or T1ESF) links over which conventional in-band signalling is provided in serial fashion, although other high speed links capable of interfacing with formats such as DS/3 or DS/4 can be utilized. Further, the links 34, 36 can be fiberoptic transmission mediums, with conversion from optic to digital communication taking place adjacent to the second interface 202. Alternatively, high speed digital serial links may be utilized over which digital signals are provided using out-of-band signalling with other communications protocols, such as X.25 or common channel signalling (SS7). It is also understood that the links 34, 36 may in certain instances instead be analog or business lines. As described in detail below, the interface 10 includes digital link, coin line and business interface circuitry for enabling the call routing operations between the paystation 12 and the central office 16, the IXC 24 and the platform 28.

The platform 28 is an applications processor and storage device linked directly to the interface 10. While not shown, the platform 28 may be linked indirectly through the network 14 to the interface 10. A line 38 connects the platform 28 to the central office 16. The platform 28 supports enhanced services and performs functions which include voice processing, storing billing information and other data, generating usage and other reports, and controlling external data bases, for example. The platform 28 further can be linked or can have access to a data base 60 which stores information about the service preferences of the billing customer. One such data base is commonly known as a Line Information Data Base (LIDB).

The platform 28 is also linked or can have access to the Traffic Operator Position System 62 (TOPS) through digital communication link 50.

The interface 10 provides basic service element (BSE) functions and also supports enhanced services either alone or in conjunction with the platform 28. Representative functions of the interface 10 include line monitoring, answer detection, call routing, coin handling and accounting and intelligent prompting for enhanced services. The interface 10 in conjunction with the platform 28 performs representative functions which include the provision of information relating to rate and exclusion tables, and enhanced service support. The interface 10 provides the rating functions by communicating with the AP 28 and the paystation 12. Generally, the rates for various long distance carriers are stored in the AP 28, and are called up by the interface 10 on an "as needed" basis. For calls that are billed to a credit or calling card, real-time rating is not necessary, and consequently, the rate tables of the platform are not accessed. For calls that are sent-paid from the payphone, i.e., coin or debit card calls, the actual rates must be accessed at the time of the call. In the instance of coin calls, the interface 10 can prompt the caller for the deposit of coinage and listen for the paystation 12 to signal such a deposit using standard coin tones, blocking the call until such time as the coin deposit requirement is satisfied. Alternatively, in the instance of a smart paystation 12, the interface 10 can signal the rate of the call to the paystation 12 and the paystation 12 can prompt and count coins for the call. In a similar fashion, this signalling can also be used when the paystation 12 provides a debit card reader and the caller is using a debit card to pay for the call. This rate information is transmitted concomitantly over the voice path used for the call, without interfering with the call. This technique is known as Data Over Voice (DOV). DOV provides for the updating of call information and rating between the interface 10 and the paystation 12 or card reader 12A while the call is in process. By providing a modem (not shown) in the paystation 12 and the interface 10, the data transmission is multiplexed on top of the voice path between the paystation 12 and the interface 10. The data signal is then split from the voice path by the interface 10 and can then be retransmitted by the interface to the AP 28 using a data communications link. Conversely, the interface 10 can take information from the AP 28, multiplex on top of the voice path and transmit it to the paystation 12 using the same DOV technique. This allows for real time rating, using the AP 28 to store and control the rates and the interface 10 to communicate them with the paystation 12 or its card reader 12A handling the collections at the paystation 12.

The interface 10, in conjunction with the AP 28 and a paystation card reader 12A, can provide an additional level of security for callers using a credit, debit or calling card. Various types of credit and debit cards can be used in the described applications. A magnetic stripe reader is the most commonly used card reader. Other card readers, such as a microprocessor card or a thermal optical card described in the U.S. Pat. Nos. 4,742,573 or 4,376,887, assigned to Landis & Gyr, can be functional with these applications as well. These cards are designed to hold an amount of prepaid credit for a caller, and then decrease the amount of credit available as the call continues. These cards are typically referred to as "decrementing cards", and some of these types of cards have the capability of being reprogrammed and therefore capable of being "recharged" with additional prepaid credit. An additional level of security is provided for these cards by the interface 10. When the paystation card reader 12A signals the insertion of a card of this type, the interface 10 records the serial number of the card, the amount of available credit signalled by the card reader 12A, and verifies it against a continuously updated database, either remotely or internally. If this verification is successful, the call is allowed to proceed. However, if the verification is not found to be accurate, the card is considered to be defective, fraudulent or tampered with, and the call is blocked. Typically, these card readers 12A have a display screen which displays the amount of time and the charges to the caller. The "display-on-demand" feature can be eliminated from the display screen after five seconds. This allows callers to continue a conversation, without diverting their attention to the time or money spent on the call. By placing a micro-switch in the end of the receptacle of the card reader 12A, the display can be triggered by the insertion of a card. Should callers care to know the time and charges for the call, they can reactivate the display screen by simply pressing on the card, reactivating the micro-switch. Alternatively, for other style card readers 12A, an activation switch can be depressed directly by the callers.

Figure 1A:
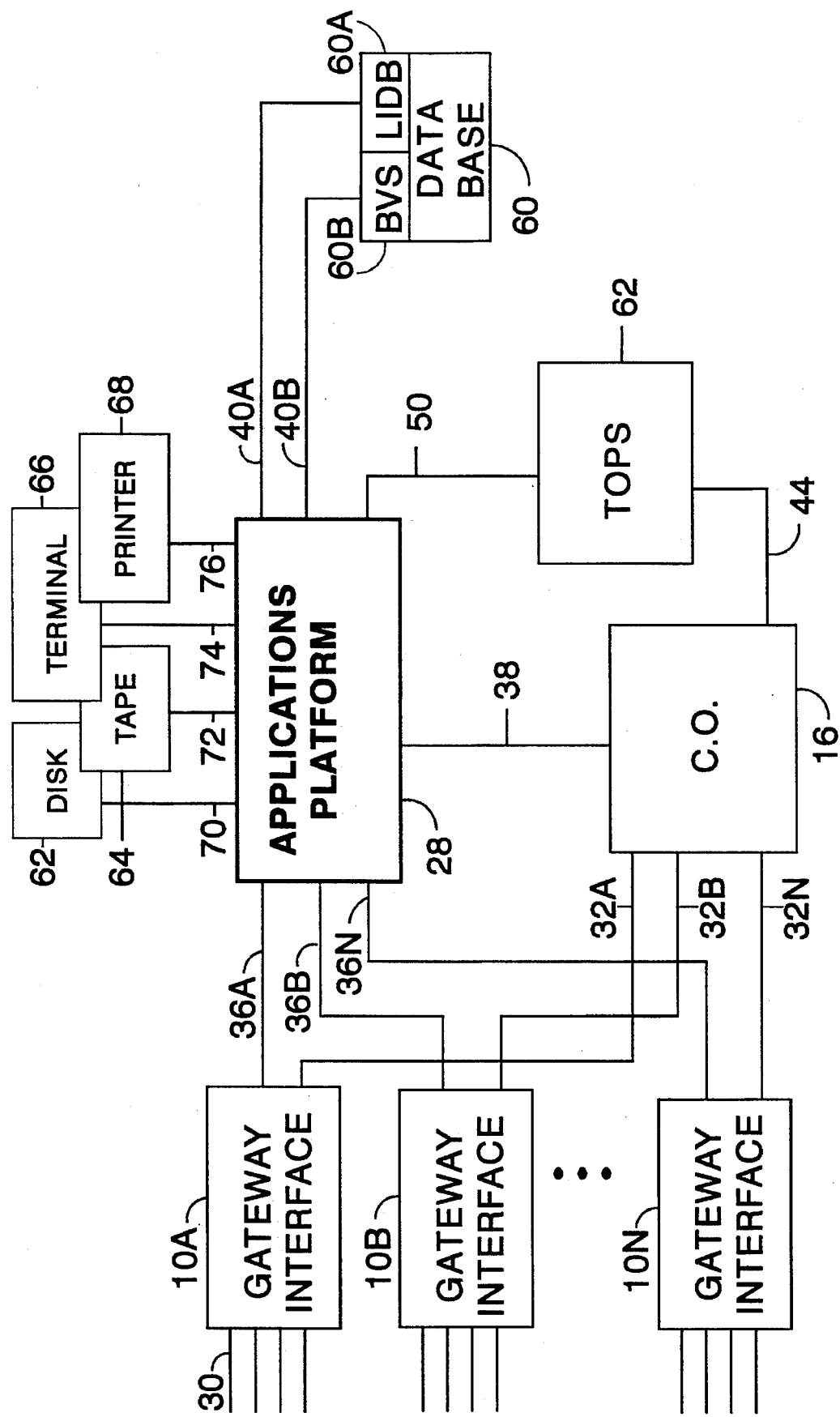
FIG. 1A is a functional block diagram illustrating multiple interfaces connected to the applications platform and its associated peripheral equipment, along with outbound connections from the platform used in the network of FIG. 1.

In FIG. 1A, the applications platform 28 is shown in conjunction with multiple interfaces 10A–10N, connected by links 36A–36N. Alternatively, the links can be data links such as links 238 or 240, shown with reference to FIG. 2. The AP 28 is utilized by the interface 10 to communicate with various data bases, such as the Line Information Data Base (LIDB) 60A connected with link 40A or a commercial credit card Billing Validation Service (BVS) 60B connected with link 40B. When a call is placed by a caller at a calling station (FIG. 1), the interface 10 determines the type of call being placed by the caller. In the case of a billable call, generally a long distance or toll call, the interface 10 plays a "bong" tone, a voice prompt or both after the caller inputs a destination number. The caller can input card information after the "bong" tone or, alternatively, can insert a card into the card reader 12A of the paystation 12. The interface 10 identifies the type of card by the input information. When the input information is to be verified, the interface 10 communicates the card information to the AP 28. Calling Card information is verified using the LIDB link 40A to the LIDB 60A, and commercial credit card information is verified using the BVS link 40B to the BVS 60B. In practice, the LIDB link 40A uses an SS7 communications protocol and the BVS link 40B uses a serial data communications type protocol such as X.25. A link 50 to the Traffic Operator Position System (TOPS) 62 is used for data communications between the AP 28 and the TOPS 62. This data generally consists of call type and call history information, which is provided to the operator's computer screen, giving the operator immediate access to the transaction, allowing more expedient call handling.

The link 30 is a standard business or coin line connecting the paystation 12 (FIG. 1) with the interface 10. As previously discussed, the link 30 advantageously provides Data Over Voice (DOV) communications, allowing the interface 10 and the paystation 12 to exchange call rating or other pertinent call information, while a call is in process. Alternatively, the call rating information can be transmitted as an in-band signal at the beginning or end of the call set-up. In one embodiment, one interface 10 can support up to 96 links 30 connected to 96 paystations 12. The processor of the interface 10 controls the DOV communications with the paystations 12 and directs the appropriate information to and from the AP 28. To provide efficient use of the data transmission capabilities, multiples of the interface 10 can be joined together to concentrate the information on the data link. The links 36A–36N can provide the data communications with the AP 28 for up to eight interfaces 10, simultaneously communicating the call data for up to 768 paystations 12. The links 36A–36N are advantageously employed in the instance when the AP 28 is located adjacent to the interfaces 10. In the instance when the AP 28 is located remotely from the interfaces 10, the data can be communicated using standard business lines 32A–32N and 38 through the Central Office 16. The use of a typical 9600

Baud modem (not shown) with this connection allows for the data communications necessary to the provision of services, without the need of a dedicated data circuit. Peripheral devices including a disk storage 62, a tape storage 64, a terminal 66 and a printer 68 are connected to the AP 28 by lines 70, 72, 74 and 76, respectively.

Figure 2:
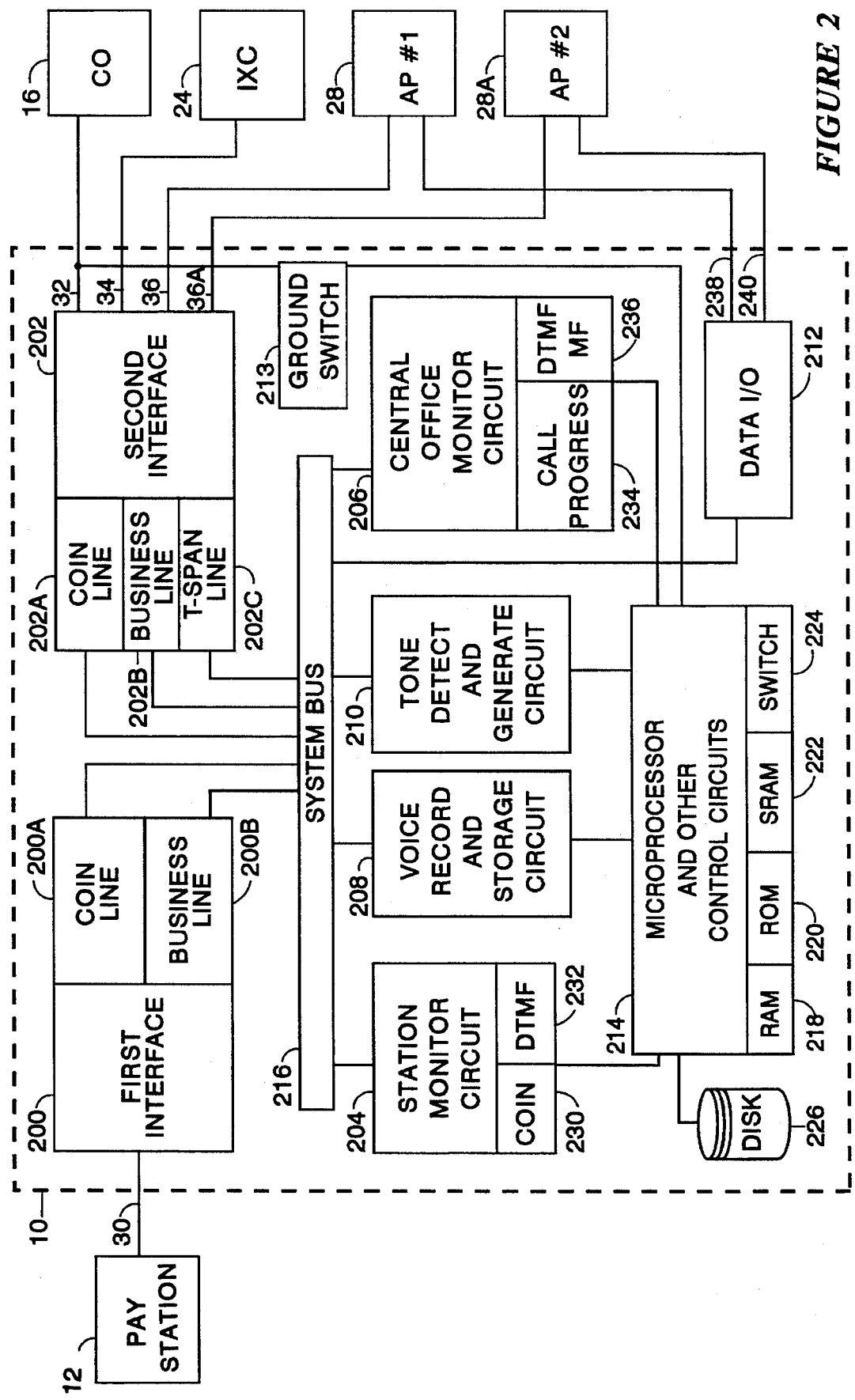
FIG. 2 is a detailed functional block diagram of the interface of FIG. 1.

FIG. 2 illustrates details of the interface 10, portions of which are also described in U.S. Pat. No. 4,825,460, incorporated herein by reference. The interface 10 comprises first and second interfaces 200 and 202, a station monitor circuit 204, a central office monitor circuit 206, a voice record and storage circuit 208, a tone detect and generate circuit 210, a data I/O port 212, a ground start switch 213 and a control circuit 214. A system bus 216 interconnects the components of the interface 10, as shown.

The control circuit 214 controls the functions of the interfaces 200 and 202, and the circuits 204, 206, 208, 210, 212 and 213, residing on the system bus 216. The control circuit 214 is preferably a microprocessor-based controller having suitable control programs for effecting the operations described below. The control circuit 214 includes standard memory comprising random access memory (RAM) 218, read only memory (ROM) 220, static random access memory (SRAM) 222, and also includes a switch 224. Disk storage 226 provides adjunct nonvolatile memory storage for the control circuit 214. The control circuit 214 is reprogrammable (e.g., to change the prompt, the paystation 12 identification or the number of unanswered rings at the called station which will initiate a call default, the enhanced service or its provider) through DTMF or other signalling from a remote location. To effect reprogramming, the parameter information is transmitted to the circuit 214 via the data I/O port 212, for example.

The disk storage 226 is a hard disk storage device in which information is stored. This information can include interface program information, data compiled and stored relating to the use of the paystation 12, billing information associated with calls handled by the interface 10, and digitized voice information for later playback or transmission.

The station monitor circuit 204 includes a coin detect circuit 230 and a dual-tone multifrequency (DTMF) detector circuit 232. The central office monitor circuit 206 includes a call progress detector circuit 234 and a dual tone multifrequency (DTMF) and multifrequency (MF) circuit 236.

The station monitor circuit 204 is connected via the bus 216 and the interface 200 to the line 30. While not shown, the circuit 204 may be alternatively connected directly to the line 30. The circuit 204 monitors the line 30 for its on/off hook condition, for coin detect signals which are processed by the coin detector circuit 230, and for receipt of predetermined DTMF signals from the paystation 12, which are processed by the DTMF detector circuit 232. The circuit 204 can also generate signals to a destination when instructed by the control circuit 214. As described above, the circuit 204 can be connected directly to the line 30 and generate signals to the network. This allows for the station monitor functions to be provided in an intelligent peripheral, for example, a smart paystation 12.

The central office monitor circuit 206 is connected via the system bus 216 and the interface 202 to the line 32, the link 34, and the link 36 and a link 36A, connected to a second platform 28A. The circuit 206 monitors the destination side of the interface and reports call progress to the control circuit 214. The circuit 206 monitors the line 32 and the links 34, 36 and 36A for detecting various conditions at the called station (e.g., answer, busy/ring no answer or other condition) upon call initiation to the called station 20, or in the alternative, call progress detection from the central office 16, the IXC 24, the platform 28 or the platform 28A. The central office monitor circuit 206 also monitors the line 32 and the links 34, 36 and 36A for detecting and generating DTMF signalling or MF signalling through the DTMF/MF detector circuit 236. The switch 224 of the control circuit 214 selectively switches the outputs of the DTMF detector circuit 232 and the DTMF/MF detector circuit 236 to the control circuit 214.

The coin detector circuit 230 of the station monitor circuit 204 detects receipt of coinage at the paystation 12 and provides an indication of coins deposited over a predetermined period of time. It is understood that its functions are not a necessary part of the interface 10 when use of the interface 10 involves originating call stations other than a coin paystation 12. The DTMF detector circuit 232 of the circuit 204 senses receipt of standard DTMF signals indicating, for example, that a caller at the paystation 12 desires to engage an enhanced service. Alternatively, the caller can either deposit the necessary coinage or use a credit card reader 12A to indicate an intention to engage the enhanced service. A representative enhanced service would be voice message delivery.

The DTMF/MF detector circuit 236 of the central office monitor circuit 206 senses receipt of network communication signals from the enhanced service provider, which are utilized as instructions by the interface 10. The call progress circuit 234 of the circuit 206 monitors for activity on the destination side of the interface 10. This can include monitoring for tones and information from the central office 16, the IXC 24, the platform 28 or 28A, the called party or other location. Information from the platform 28 or 28A can include call progress messages or billing validation messages, transmitted from the IXC 24 or other point in the network using an SS7 protocol, and translated by the platform 28 or 28A for retransmission to the interface 10.

The voice record and storage circuit 208 is controlled by the circuit 214 to place voice prompts on the line 30 to the paystation 12 and/or to the called party. The circuit 208 further is able to record digitized voice messages or prompts in either the RAM 218 for short term storage as would be used in the handling of a "0+" to "1+" call, as discussed below, or in the disk storage 226 for long term storage as can be used in enhanced services such as voice messaging. It is known in the art that analog voice transmissions must be converted to digital data to be stored in a digital format. This conversion can be in the adaptive differential pulse code modulation (ADPCM) or other such conversion protocol as is appropriate to store and/or to transmit voice impulses in a digital format. Control of the circuit 208 by the circuit 214 is enabled through the receipt of signals by the station monitor circuit 204 and the central office monitor circuit 206.

The tone detect and generate circuit 210 detects and generates DTMF and MF signals during the redirection or reformatting stage of the call, as well as other audible tones generally used to communicate in the switched network for performing speed dial and other functions.

The voice record and storage circuit 208, the tone detect and generate circuit 210 and/or the control circuit 214 may be shared by a plurality of interfaces each having the disclosed switching and monitoring components.

The data I/O port 212 supports high-speed data transmission and reception between the interface 10 and platforms 28 and 28A. The transmission and reception of information through the data I/O port 212 is accomplished utilizing an RS-232 serial port, X.25, or other high-speed data communications links 238, 240, for example. A representative use of the data I/O port 212 is to handle requests for verification of billing information from credit or calling card data bases such as LIDB 60A, or downloading file information from the disk storage 226 for storage elsewhere. The interface 10 communicates with the platform 28 in an X.25 signalling protocol. The platform 28 can communicate with the network 14 in the common channel signalling system 7 (SS7) communications protocol. When the SS7 communications protocol is needed to perform validation, or arbitration between the interface 10 and other network platforms, the interface 10 uses the data I/O port 212 to the platform 28, calling up these resources on an "as needed" basis. The platform 28 translates between the X.25 and the SS7 protocols. The data I/O port 212 is also capable of transferring information such as prerecorded voice messages and associated delivery information between the interface 10 and the platform 28 or 28A for delivery.

The ground start switch 213 is independently connected between the control circuit 214 and the line 32 for the purpose of generating a ground start after the tone detect and generate circuit 210 has sent a speed dial number or other tones from the interface 10. The ground start is required to enable the interface 10 to complete a connection through a coin line to a destination. It is understood that power and switching requirements associated with a standard coin line are met in the coin line interface circuit 200A, discussed below.

The first interface 200 includes both a coin line interface 200A and an analog line interface 200B to enable connection to either a coin or on a standard business or residential tip and ring analog line 30. The interface 200B can provide dialtone, basic and enhanced service connections to an intelligent paystation 12. The interface 200A further can provide connections for coin control and rating functions necessary for a standard paystation 12. While not shown, it is understood that multiple lines 30 can be supported by the interfaces 200A, 200B of the first switch 200.

The second interface 202 includes a coin line interface 202A, an analog line interface 202B and a link interface 202C. The coin line and analog line interfaces 202A, 202B are substantially the same as the previously described interfaces 200A, 200B and operate to connect the lines 32 and 34 to the interface 10. The link interface 202C operates to connect the link 36 or 36A to the interface 10.

The first and second interfaces 200, 202 are each connected to the system bus 216. The control circuit 214 selectively enables interconnections via the system bus 216 between the interfaces 200A, 200B and the interfaces 202A, 202B and 202C, as appropriate. The interfaces 200, 202 further provide analog to digital and digital to analog conversions as well as digital protocol conversions as required to enable communications between the first and second interface circuits 200, 202 and the bus 216. The control circuit 214 also operates to connect other components of the interface 10 via the bus 216 to any of the circuits 200A, 200B, 202A, 202B, and 202C. The interface 10 thus communicates with both the paystation 12 and either the central office 16, the IXC 24 or the platforms 28, 28A utilizing the interfaces 200 and 202. While the interconnection functions of the interface 10 utilizing the interfaces 200 and 202 under control of the circuit 214 take place via the bus 216, it is understood that the same interconnections may alternatively be accomplished with mechanical switches (not shown).

In operation, the interface 10 provides basic and enhanced call services from a centralized location in front of the central office 16 for either a standard or an intelligent paystation 12, and further is able to selectively redirect calls in the performance of these services through gateway connections to service providers. The functions of the interface 10 are controlled by computer program instructions executed in the control circuit 214.

In the instance where the interface 10 is located within the central office 16, adjacent to the CO switch, as previously described, the individual resources of the interface 10 can be utilized on an "as needed" basis in conjunction with the CO switch.

In an exemplary telephone call, the interface 10 is utilized to provide alternative billing and alternative redirection of a call from the paystation 12 to either the central office 16, to the IXC 24 or to the platform 28 or 28A of an enhanced service provider. The paystation 12 is either an intelligent paystation 12 in which the line 30 is an analog line or a standard paystation 12 in which the line 30 is a coin line. It is understood that variations exist in the communications protocol for controlling signalling and routing involving each of these types of lines, as discussed more fully below.

In response to the paystation 12 going "off hook," the station monitor circuit 204 monitors for DTMF signals received from the paystation 12 on the system bus 216 through the first interface 200, via the appropriate interface circuit 200A or 200B. As an example, the DTMF signals correspond to "0" followed by ten digits, intended for placement of a long distance ("0+") call. Under control of the circuit 214, the voice record and storage circuit 208 issues a voice prompt to the paystation 12 through the interface 200 to request the input of call billing information. The tone detect and generate circuit 210 then likewise issues a "bong" tone, voice prompt or both, to the paystation 12 to prompt the caller to enter the required information. Based on the input billing information, the circuit 214 determines which service provider the user has selected for delivery of the call or the provision of other services. The billing information is stored in the RAM 218 for later transfer to nonvolatile storage in the disk storage 226 or transfer to a remote storage (not shown) in the platform 28 or 28A via the data I/O port 212. Alternatively, the billing information may be forwarded to the carrier or service provider without burdening the caller to re-enter this information. Validation of the billing information is accomplished under the control of the circuit 214 utilizing a local data base or alternatively a remote data base accessed via either the second interface 202 or the data I/O port 212. Validation to a data base requiring SS7 communications can occur using the platform 28 or 28A in which the interface 10 directs the platform 28 or 28A to validate given information using a specific data base via SS7 communications. In the instance wherein the data base is LIDB 60A, a query is presented requesting information about the billing information provided by the caller. This billing information can include calling card or proprietary card information, as well as destination number information for collect calls. The LIDB 60A response can be as much as 60 bytes of information which includes the preferences of the billed party. This Basic File Message (BFM) can include a primary and a secondary choice of long distance carrier, similar choices for international carriers, operator service, and alternate or other enhanced service providers.

After successful validation of the billing information, the circuit 214 directs the second interface circuit 202A to be connected to the central office 16 for routing of the call to the central office 16. The DTMF/MF circuit 236 transmits the destination number via the bus 216 and the interface circuit 202a to the central office 16. Further, the second interface circuit 202A is operably coupled via the bus 216 to the first interface 200 so that the paystation 12 and the central office 16 are operably connected.

After successful validation of the billing information, the call may alternatively be routed directly to the IXC 24 by the interface 10. This is accomplished by the control circuit 214 coupling the second interface circuit 202B to the link 34 instead of coupling the circuit 202A to the line 32. Signaling to the IXC 24 is accomplished via the DTMF/MF circuit 236 through the bus 216 and the circuit 202B as required. Further, the second interface circuit 202B is operably coupled via the bus 216 to the first interface 200 so that the paystation 12 and the IXC 24 are directly operably connected. The foregoing thus enables circumvention of the central office 16 to complete a long distance call.

The call may also alternatively be routed to the application platform 28 or to the application platform 28A by the interface 10. This is accomplished by the control circuit 214 coupling the third circuit 202C to either the link 36 or 36A. The DTMF/MF circuit 236 transmits the destination number via the bus 216 to the platform 28 or 28A. The platform 28, 28A can then transmit the call through the network 14 or the IXC 24 using the SS7 protocol. Further, the interface circuit 202C is operably coupled via the bus 216 to the first interface 200 so that the paystation 12 and either the platform 28, 28A are operably connected. The foregoing thus enables direct connection of the platform 28 or 28A to the interface 10 to provide enhanced services without requiring connection to an enhanced service provider through other switching systems. It is understood that a variety of enhanced services may thus be provided to the caller by the interface 10 in conjunction with the platform 28 or 28A. For example, the control circuit 214 can send the call to the platform 28 for a service such as generating a "bong" tone to the caller, to be processed by the platform.

Another form of call routing utilizes the data I/O port 212 to transmit a request for a connection by the platform 28 or 28A to the second interface 202 through the link 36 or 36A. The request is sent directly from the data I/O port 212 to the platform 28 or 28A via a data link 238 or 240, respectively, instead of via the link 34 or 34A. The destination number may also be transmitted via the data I/O port 212 to the platform 28 or 28A at this time. The first interface 200 is then interconnected via the bus 216 to the second interface 202. If the destination number has not been transmitted to the platform 28 or 28A by the data I/O port 212, the DTMF/MF circuit 236 can transmit the destination number via the second interface 202. An advantage of utilizing the I/O port 212 as described is that it uses the data link 238 or 240 for data transmission and the link 36 or 36A for voice transmission, for increased efficiency.

In each of the above call routing examples, once the call destination information has been transmitted the call progress circuit 234 monitors call progress in order to enable the provision of additional enhanced services during the call. Such services include, for example, automatic message delivery or automatic call back. Automatic message delivery is described in U.S. Pat. No. 4,825,460. Automatic call back is an alternative secondary call completion service in which a call is initiated back to the paystation 12 from the destination upon completion of a call to the destination by the interface 10. Automatic call back is described further with reference to FIG. 12 below. Other enhanced services may also be provided.

The operations of the interface 10 and the applications platform 28 are further described with reference to FIGS. 3–13. FIGS. 3–13 are control logic flow diagrams illustrating specific functions of the interface 10 and the applications platform 28.

Figure 3:
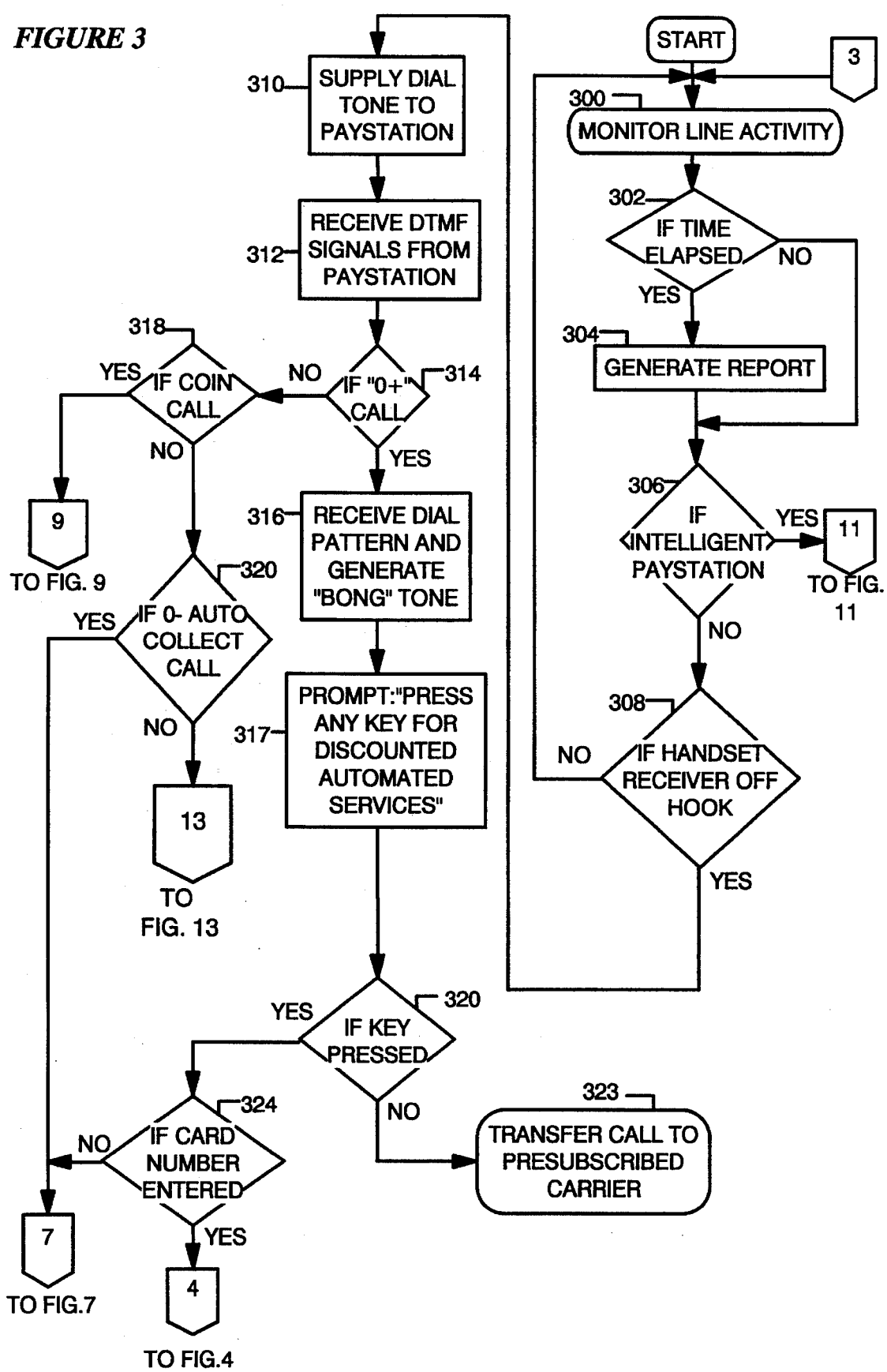
FIG. 3 is a flow chart diagram illustrating control logic implemented by the interface of FIG. 1 for processing a telephone call.

FIG. 3 illustrates the control logic of the present invention for operating the interface 10 upon receipt of an incoming telephone call from the paystation 12 on the line 30. Execution begins at step 300 with the control circuit monitoring the line 30 for any activity. This monitoring function is provided by the station monitor circuit 204. At step 302 a determination is made whether a predetermined time period has elapsed in which there is no activity on the line 30. If a predetermined time period has elapsed, execution proceeds to step 304. At step 304 a report is generated relating to activity of the line 30. The report may be utilized to provide notification of activity which is inconsistent with proper operation of the paystation 12. The interface 10 is able to measure the activity of the paystation 12 against the activity of similar paystations associated with the interface 10 and is further able to measure the activity against historical activity information. This report can be delivered via the interface 202 or via the DATA I/O port 212 to a remote location.

Execution proceeds from step 304 to step 306. If at step 302 the time period has not elapsed, execution proceeds directly from step 302 to step 306. At step 306 a determination is made whether the paystation 12 associated with the line 30 is an intelligent paystation. If the paystation 12 is an intelligent paystation, execution follows the communications protocol subsequently described with reference to FIG. 11, for the purpose of arbitrating the control function between the intelligence of the paystation 12, the interface 10, and the platform 28 or 28A, as necessary to provide basic and enhanced services to the call.

If at step 306 the paystation 12 is not an intelligent paystation, execution proceeds to step 308 where a determination is made whether the handset of the paystation 12 has gone off-hook. If at step 308 the handset has not gone off-hook, execution returns to step 300. If the handset has gone off-hook, execution proceeds to step 310. At step 310 a dial tone is supplied to the paystation 12 by the tone detect and generate circuit 210. At step 312 DTMF signals are received from the paystation 12 by the station monitor circuit 204 and analyzed to determine the call type in accordance with the digits dialed by the caller.

While not shown, it is understood that when the DTMF signals received from the paystation 12 indicate emergency and certain service type calls, these calls are transmitted by the interface 10 directly to the central office 16 in order to expedite the call.

At step 314 a determination is made whether the call from the paystation 12 is a "0+" call. A "0+" call is a call in which a caller dials the digit "0" followed by either seven or ten digits. This indicates an instruction for call billing to a source other than to the paystation 12. If the call is a "0+" call, control proceeds to step 316, discussed below.

If at step 314 the call is not a "0+" call, execution proceeds to step 318 where a determination is made whether the call is a coin ("1+" or "sent paid") call. A coin call is a call in which the caller deposits coinage in the paystation 12 to pay for the completion of the call. If at step 318 the call is a coin call, execution proceeds to step 900, described subsequently with respect to FIG. 9.

If at step 318 the call is not a coin call, execution proceeds to step 320. At step 320 a determination is made whether the call is a "0– autocollect" call. A "0– autocollect" call is a call in which the interface 10 handles the recording of the caller's name and determines if the called party will accept the billing. If at step 320 the call is a "0– autocollect" call, execution proceeds to step 700 which is subsequently described with reference to FIG. 7. If at step 320 the call is not a 0– autocollect call, execution proceeds to FIG. 13 wherein the procedure for routing a call to a live operator is described. When a call is routed to a live operator, any call history as stored by the control circuit 214 is able to be transferred with the call to the live operator as described in detail in FIG. 13.

If at step 314 the call is a "0+" call, execution proceeds to step 316. At step 316 the interface 10 receives the "0+" dialing sequence and delivers a "bong" tone to the paystation 12, indicating that the caller can now enter some billing information or instructions regarding the handling of the call. At step 317 the interface 10 prompts the caller to press a keypad key for discounted automated services. These services include, for example, automated billing validation, routing to one or more selected service providers and call completion through alternative local or Interexchange carriers.

At step 320 a determination is made whether a key is pressed in response to the above prompt. If not, at step 323 the call is transferred to a presubscribed carrier as a 1+ or an automated 0+ call.

If at step 320 a key is pressed, a determination is made at step 324 whether a credit or calling card number is entered within a designated time period. If a key is not pressed within the allotted time period, execution proceeds to step 400, described below with reference to FIG. 4, for the performance of call billing procedures. If at step 324 a key is pressed within the allotted time, execution proceeds to step 700, subsequently described with reference to FIG. 7, in which autocollect set-up procedures are performed.

Figure 4:
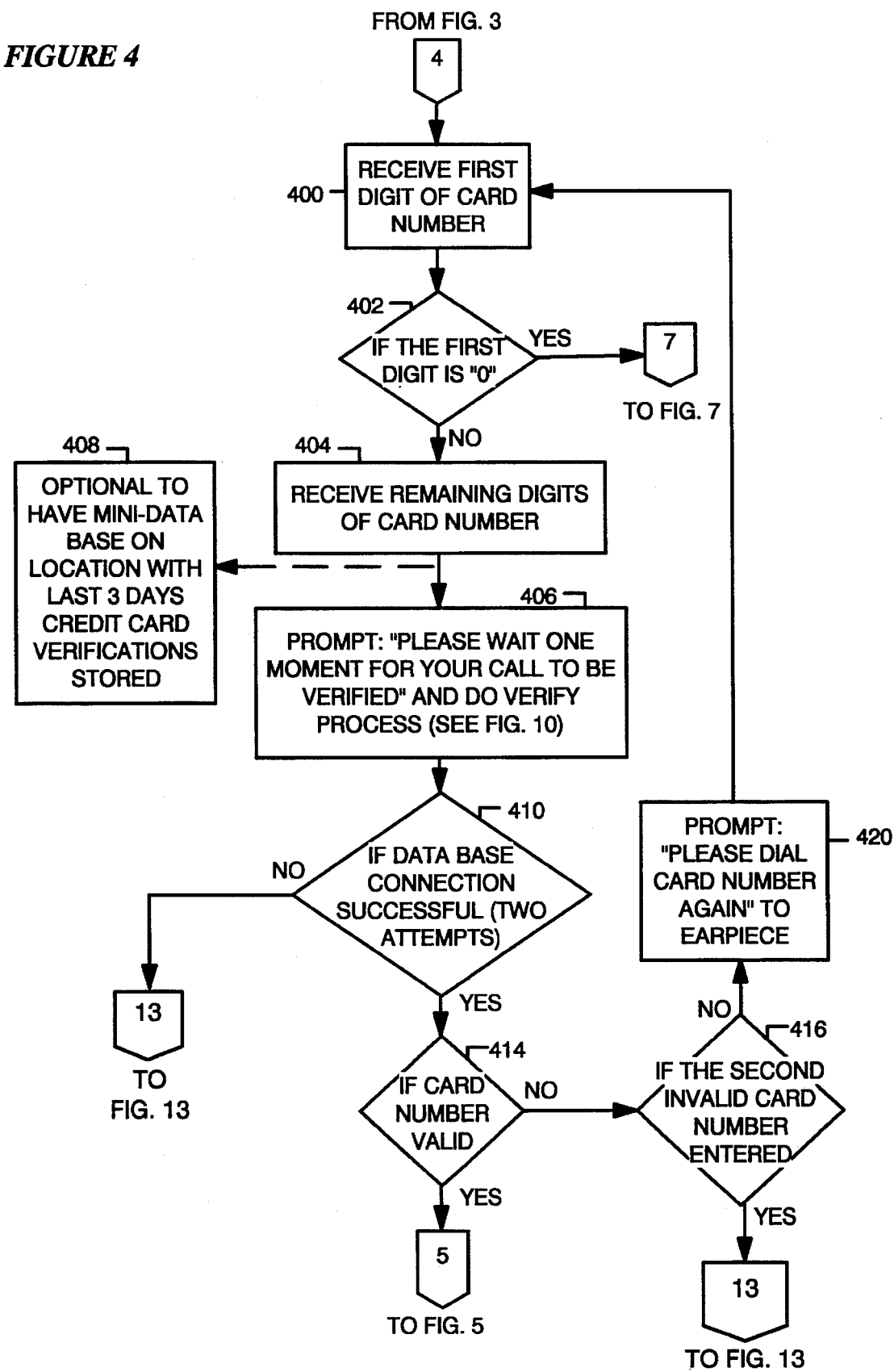
FIG. 4 is a flow chart diagram illustrating control logic implemented by the interface of FIG. 1 for gathering billing information.

Referring to FIG. 4, the procedures for gathering the billing information from the paystation 12 are described. At step 400 the interface 10 receives a first digit of a billing card number entered by a caller at the paystation 12. At step 402 a determination is made whether the digit entered is a "0". If at step 402 the digit is a "0", execution proceeds to step 700, described below in FIG. 7, for performing autocollect set-up procedures. If at step 402 the first digit is not a "0", at step 404 the interface 10 receives the remaining digits entered from the paystation 12.

While not shown, it is known in the industry that access to the network 14 can sometimes be gained by using an equal access carrier code (10xxx) at the beginning of the dialing sequence. In this scenario, the interface 10 will prevent a "1+" (10xxx1+) call without first obtaining a coin deposit or billing information.

At step 406 the interface 10 commences the call billing information verification process by connection to an applications platform 28 linked to the data base 60. The verification process is more fully described below with reference to FIG. 10. It is understood that while the verification process is being accomplished, a prompt is issued to the paystation 12 asking the caller to wait while the verification process is being performed. In step 408, it is understood that the verification information can be retrieved from the disk storage 226. Accordingly, if the disk storage 226 is utilized, the prompt at step 406 may not be necessary due to the rapid completion of the verification process. At step 410 a determination is made whether the data base connection is successful. If the data base connection was not successful after two attempts at step 410, the call is routed to a live operator with a digital file showing the information to be verified and the bad attempts. Audio prompts can also be routed to the operator at this time as further described with reference to FIG. 13. If at step 410 the data base connection is successful, at step 414 a determination is made whether the caller's billing card number is valid. If at step 414 the card number is valid, execution proceeds to step 500, discussed below with reference to FIG. 5, for the performance of "0+" to "1+" call conversion. If the data base accessed at step 410 is LIDB 60A, the billed party's choice of service providers is also ascertained at this step.

If at step 414 the card number is not valid, a determination is made at step 416 whether it is the second invalid card number entered. If at step 416 it is the second card number entered, execution proceeds to FIG. 13. If at step 416 it is not the second invalid card number, execution proceeds to step 420. At step 420, a prompt is issued to the paystation 12 asking the caller for the card number to be entered again. Execution then returns to step 400.

Figure 5:
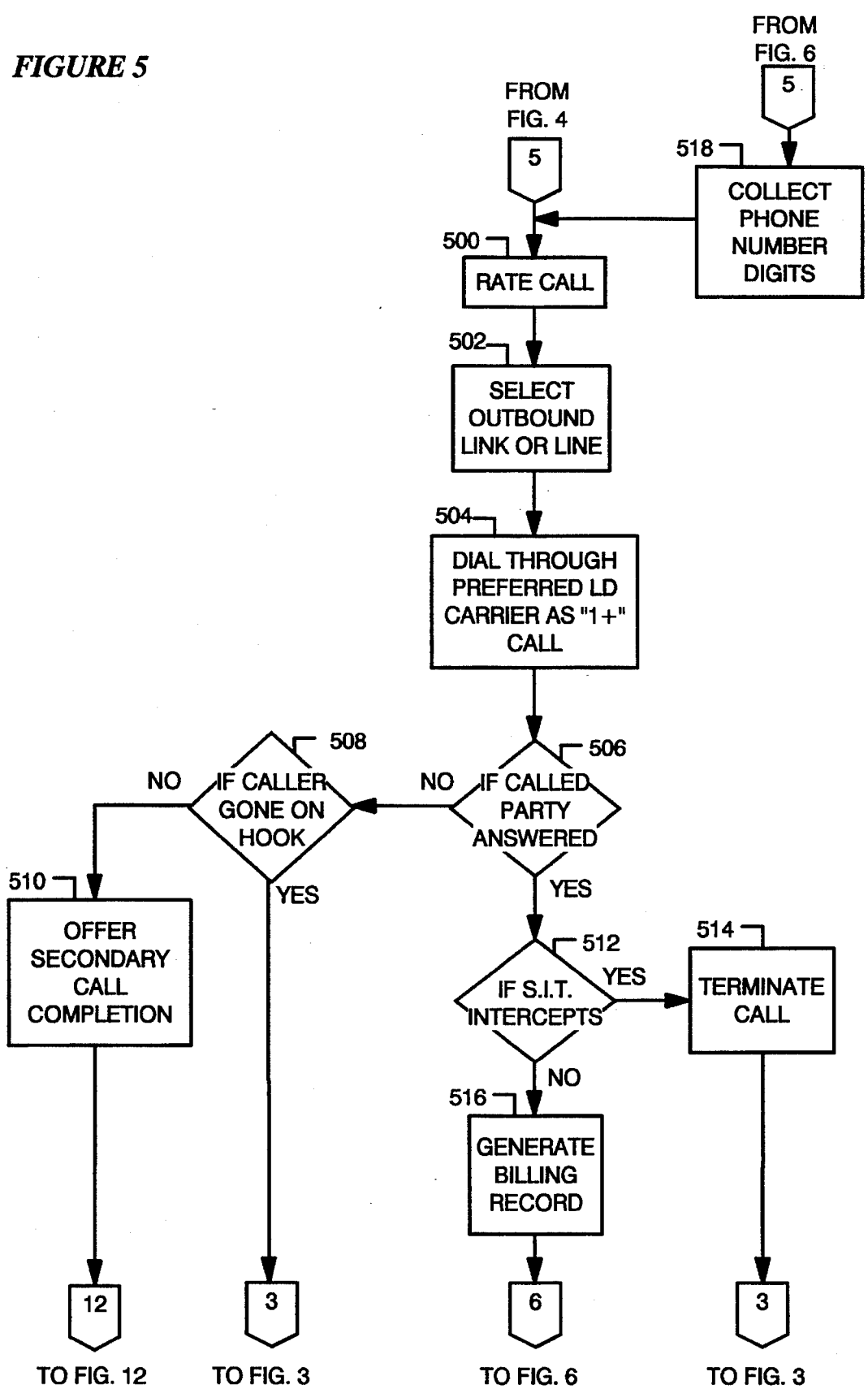
FIG. 5 is a flow chart diagram illustrating control logic implemented by the interface of FIG. 1 for performing "0+" to "1+" call conversion.

FIG. 5 illustrates the control logic for "0+" to "1+" call conversion in which the interface 10 places the call as a "1+" call through the central office 16, IXC 24 or other network link after verifying the caller billing information. This process causes the interface 10 to be billed by the carrier for the call, it being understood that the interface 10 in turn uses the captured billing information received from the caller to bill the caller. An advantage of this function is that by the use of lines dedicated to the interface 10, such as the links 34, 36 and 36A which connect the interface with the IXC 24 and platforms 28, 28A, a more efficient use of transport technologies is provided. A further advantage of this function is that by using the information obtained in the LIDB 60A inquiry, the billed party's choice of carrier can be selected. Further, the cost of routing the call through the central office 16 is eliminated, thereby reducing the cost incurred in making the call.

At step 500 the call is rated either using an internal data base stored in the disk 226 or stored remotely and accessed through the data I/O link 212. For example, the particular call rate is usually determined by the carrier providing the call service. At step 502 the interface 10 selects an outbound link or line via interface 202. If a choice of carriers was determined during the data base access at step 410, it is during this step 502 the appropriate choice is made. At step 504 the interface 10 transmits the destination number using the DTMF/MF circuit 236 to the service provider. This transmission can take place directly to the central office 16, the IXC 24, platforms 28, 28A or through the central office 16 to an additional IXC via an equal access code (10xxx). At step 506 the call progress is monitored by the call progress monitor circuit 234 and a determination is made whether the call has been answered.

If at step 506 the call is not answered within a determinable time, execution proceeds to step 508 where a determination is made whether the caller has gone on hook. If not, execution proceeds to step 510. At step 510 the interface 10 offers the caller a secondary call completion service. One such service is automatic message delivery, as described in U.S. Pat. No. 4,825,460, for example. Another call completion service is automatic call-back, described below in FIG. 12. If at step 508 the caller has gone on hook, execution returns to step 300 in FIG. 3.

If at step 506 the call is answered, execution proceeds to step 512 where a determination is made whether special instruction tones ("SIT tones") intercepted the call. If at step 512 the SIT tones intercepted the call, then the call is terminated at step 514 and execution returns to step 300 in FIG. 3. If at step 512 the SIT tones did not intercept the call, execution proceeds to step 516. At step 516, a billing record is generated and stored. It is understood that other call conditions such as fast-busy or operator intercept, for example, would result in a billing record not being generated. Execution then proceeds to perform a chain dialing procedure, for example, as described below in FIG. 6. At step 518, the digits dialed in response to a chain dialing procedure are received and execution returns to step 500.

Figure 6:
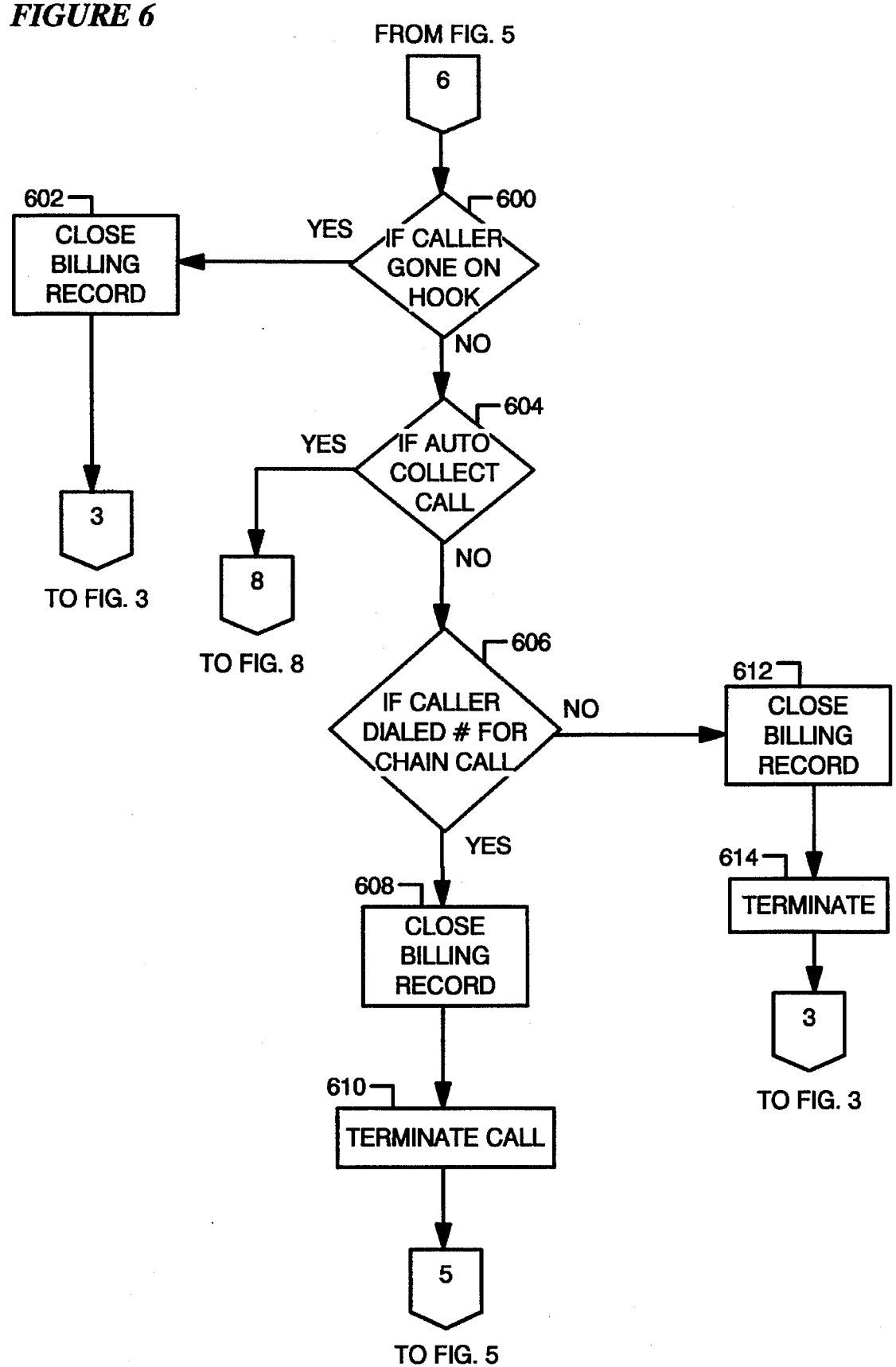
FIG. 6 is a flow chart diagram illustrating control logic implemented by the interface of FIG. 1 for performing chain dialing.

FIG. 6 illustrates a chain dialing procedure for completion of successive calls without having to reenter billing information. At step 600 a determination is made whether the caller has gone on hook. If the caller has gone on hook, execution proceeds to step 602, where the billing record is closed and execution returns to step 300 in FIG. 3. If at step 600 the caller has not gone on hook, execution proceeds to step 604. At step 604 a determination is made whether the call is a collect call. If it is a collect call, execution proceeds to FIG. 8 for performance of autocollect acceptance procedures, discussed below. If at step 604 the call is not a collect call, execution proceeds to step 606 where a determination is made whether the caller has requested chain dialing. If at step 606 the caller has requested chain dialing, then at step 608 the billing record is closed. At step 610 the call is terminated and execution returns to step 518 in FIG. 5. At step 518 the call destination number is received. If at step 606 chain dialing is not requested, execution proceeds to step 612. At step 612 the billing record is closed. At step 614 the call is terminated and execution returns to step 300 in FIG. 3.

Figure 7:
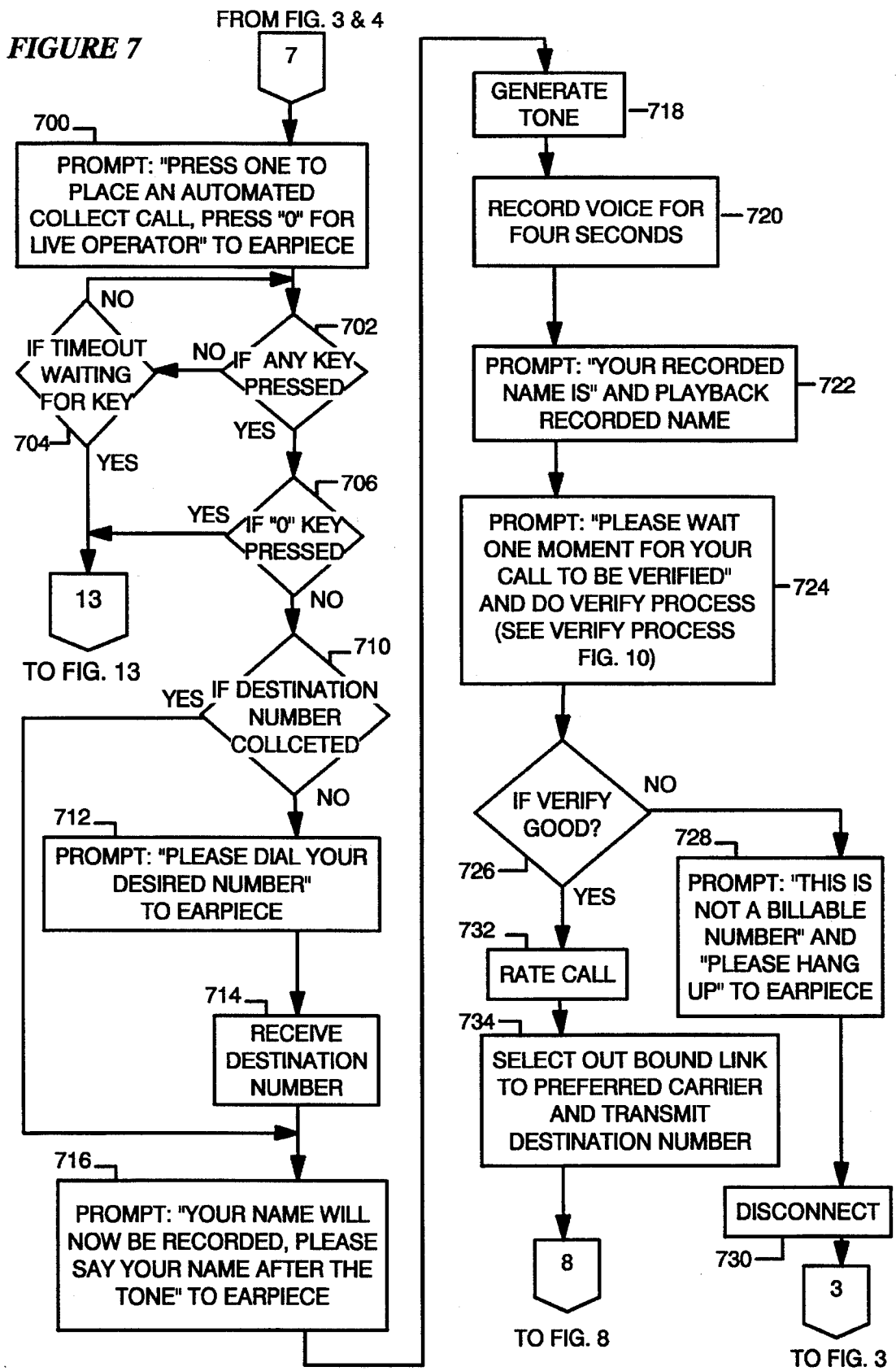
FIG. 7 is a flow chart diagram illustrating control logic implemented by the interface of FIG. 1 for performing automated collect (also referred to as autocollect or "0–") call set up.

FIG. 7 illustrates control logic for automated collect call set-up. At step 700, a prompt is issued requesting the caller to designate whether an automated collect call or a live operator call is requested. At step 702 a determination is made whether any key is pressed. At step 704 if no key is pressed, a determination is made whether a time period has elapsed. If at step 704 the time period has elapsed, execution proceeds to FIG. 13. Otherwise, timing is continued and control returns to step 702. If at step 702 a key is pressed, execution proceeds to step 706 where a determination is made whether "0" has been pressed. If so, the call is routed to the live operator as described with reference to FIG. 13. If at step 706 the "0" key was not entered, execution proceeds to step 710. At step 710 a determination is made whether the destination number has been dialed. If the destination number has been dialed, execution proceeds to step 716. If at step 710 a destination number has not been dialed, execution proceeds to step 712 where the caller is requested to enter destination information. At step 714 the destination number is received by the interface 10.

At step 716 the caller is prompted to record his name. At step 718 the interface 10 generates a tone to indicate to the caller to record his name. At step 720 the interface 10 records the name. At step 722, the recorded name is played back to be verified by the caller. At step 724 the caller is prompted to wait while the dialed number is verified, and the verification process takes place, as described below in FIG. 10. At step 726, a determination is made whether the destination billing number is valid. If not, execution proceeds to step 728. At step 728, the caller is prompted that the number is not billable. At step 730, the call is terminated and execution returns to step 300 in FIG. 3. If at step 726 the billing number is valid, execution proceeds to step 732 where the call is rated. At step 734, the interface 10 selects an outbound link or line according to the preference of the billed party (which, in this case, is the called party) for completion of the call. Execution then proceeds to FIG. 8 for performance of automated collect call acceptance procedures.

Figure 8:
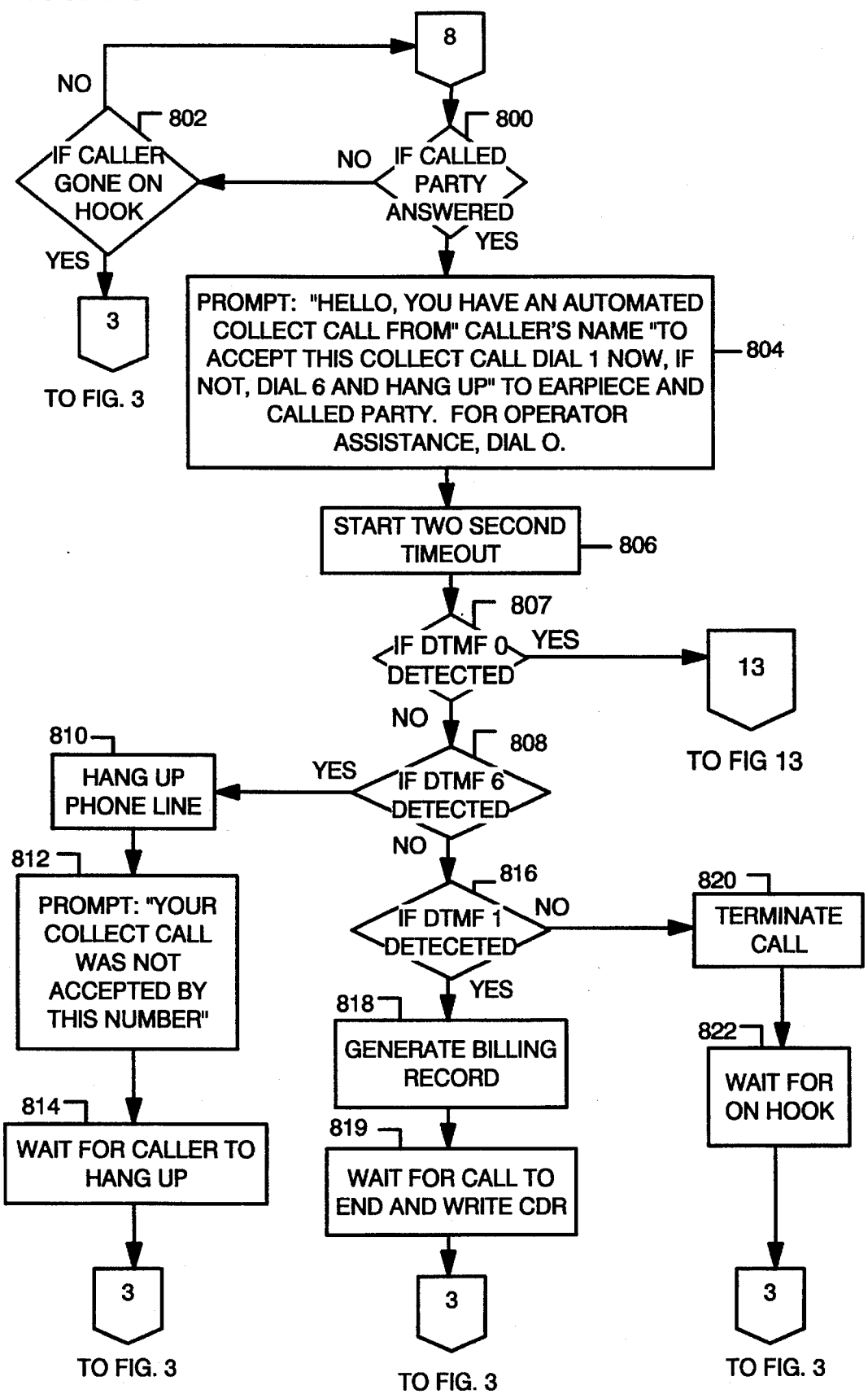
FIG. 8 is a flow chart diagram illustrating control logic implemented by the interface of FIG. 1 for performing autocollect call acceptance.

FIG. 8 illustrates control logic for performing automated collect call acceptance procedures. At step 800, a determination is made whether the called party has answered the call. If not, at step 802 a determination is made whether the caller has not gone on hook. If at step 802 the caller has not gone on hook, execution returns to step 800. If at step 802 the caller has gone on hook, execution returns to step 300 in FIG. 3. If at step 800 the called party has answered, execution proceeds to step 804. At step 804 a prompt is issued to the called party informing him that he has received an automated collect call from the caller. The prompt delivers the caller's recorded name. The prompt invites the called party to accept the collect call by dialing "1" or decline the collect call by dialing "6" or obtain operator assistance by dialing "0". Typically, the prompt is also audible to the calling party.

At step 806 a two-second timer is started, such that if the called party does not enter an instruction within the two seconds, the call is terminated, or alternatively routed to a live operator. At step 807, a determination is made whether the caller has requested live operator assistance, further described with reference to FIG. 13. If not, at step 808, a determination is made whether the DTMF "6" tone is detected from the called party, indicating the called party does not accept the collect call. If a "6" is detected, at step 810 the interface 10 terminates the call. At step 812, a prompt is issued to the caller indicating the collect call was not accepted. At step 814 the interface waits for the caller to hang up and execution returns to step 300 in FIG. 3.

If at step 808 a "6" was not detected from the called party, at step 816 a determination is made at step 816 whether a DTMF tone "1" is detected from the called party, indicating a desire to accept the collect call. If so, at step 818 a billing record is generated and the called party is billed for the call. Execution then proceeds to step 819 wherein the completed call is ended and a call detail record (CDR) is written into the file storage memory. If at step 816 a "1" is not detected, at step 820 the call is terminated. At step 822 the interface 10 waits for the paystation 12 to go on hook and execution then proceeds to step 300 in FIG. 3.

Figure 9:
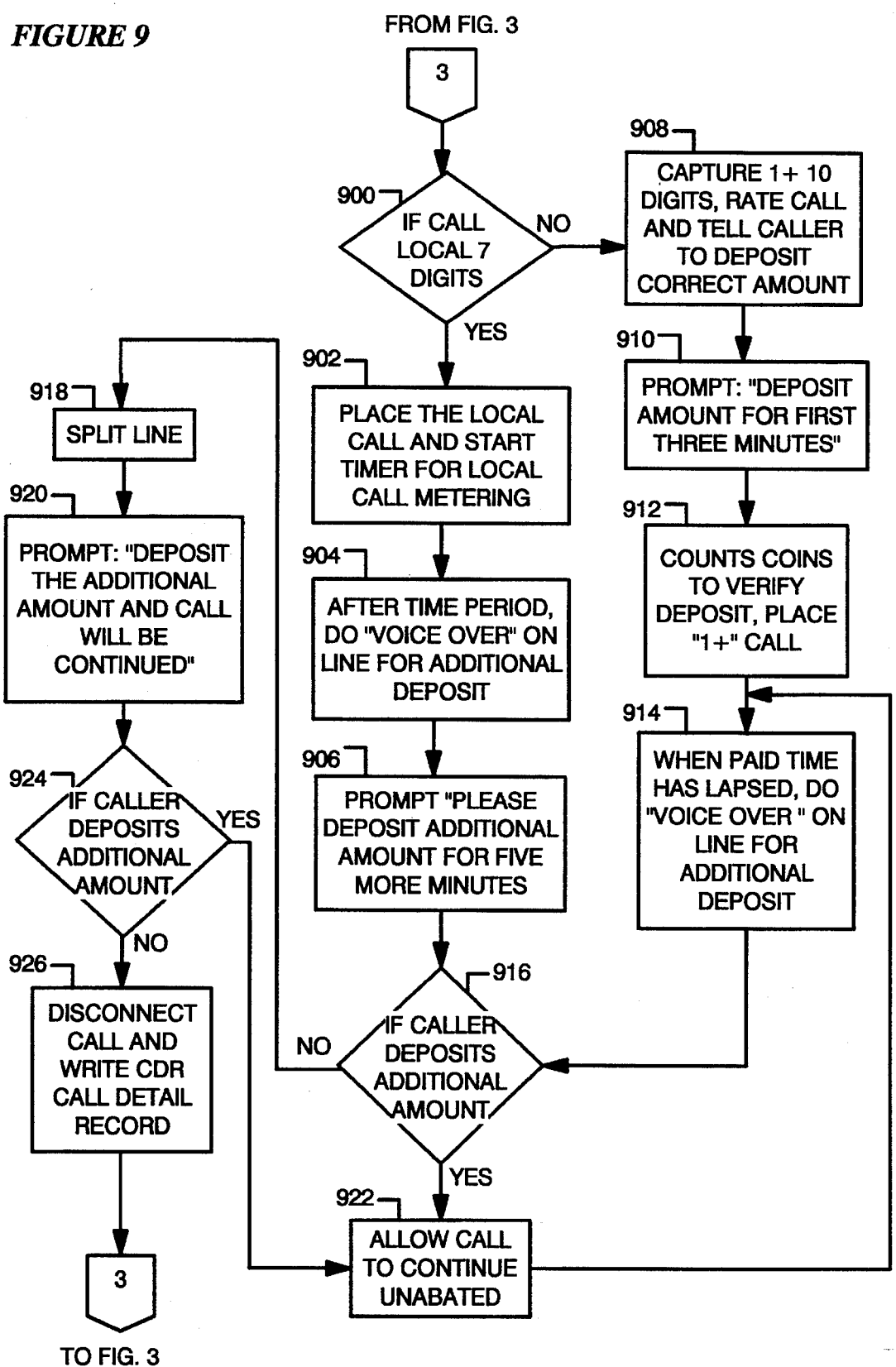
FIG. 9 is a flow chart diagram illustrating control logic implemented by the interface of FIG. 1 for processing a sent-paid call.

FIG. 9 illustrates control logic for handling a sent paid (also referred to as a "1+" or "coin") call from the paystation 12. At step 900, a determination is made whether the call is a local (seven digit) call. If so, at step 902 the local call is placed and a timer is started for local call metering. At step 904, a voice-over prompt is issued requesting additional deposit, typically after a five minute period. The caller is again prompted for additional deposit at step 906.

If at step 900 the call was not a local call but a long distance call, at step 908 the interface 10 captures the digit "1" and the additional ten digits for directing the call. At step 910 the interface 10 rates the call and prompts the caller to deposit the correct amount. At step 912 the interface 10 counts the coins deposited to verify for a correct amount. The coin counting also may take place at the paystation 12.

The interface 10 then places the call from the interface 10. It is understood that the call is routed by the interface 10 to a desired service provider, such as directly to an IXC 24, a platform 28 or the central office 16 for call delivery. At step 914 a voice-over prompt is issued after expiration of a set period of time requesting the caller to deposit additional coinage for continuing the call. At step 916 a determination is made whether the caller has deposited the additional amount. If not, at step 918 the interface "splits" the line so that while the call is still connected, the caller and called party are no longer in audio communication. The caller is prompted a second time to enter the required deposit at step 920. At step 924, a determination is made whether the caller has deposited the additional amount. If so, at step 922 the call continues unabated. If at step 916 the caller does deposit the additional amount, execution proceeds to step 922. At step 922 the call continues unabated and execution returns to step 914. If at step 924 the caller does not deposit the additional amount, at step 926 the call is disconnected and a call detail record (CDR) is prepared. Execution returns to step 300 in FIG. 3.

Figure 10:
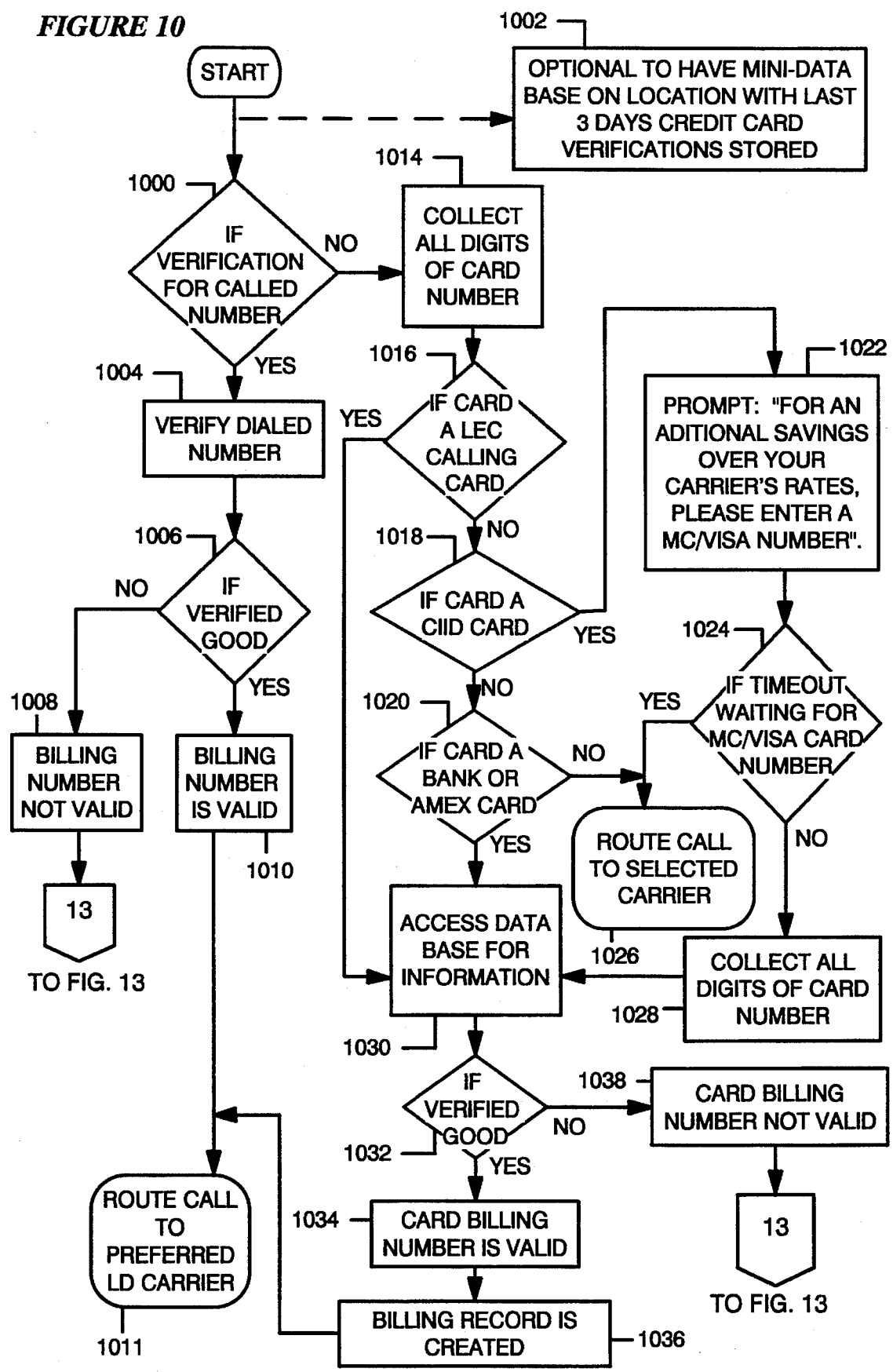
FIG. 10 is a flow chart diagram illustrating control logic implemented by the interface of FIG. 1 for performing credit card validation.

FIG. 10 illustrates control logic for validating call billing information. At step 1000, a determination is made whether the verification to occur is for a called (destination) number, such as when the caller is placing an automated collect call, for example. If not, the verification would be for a billing card number, as discussed below. At step 1002 the verified credit card numbers for billed calls over a several day period are stored in a data base. If at step 1000 the verification is for a called number, at step 1004 the interface 10 verifies the number dialed to determine if the call destination is one to which a call can be billed. At step 1006 a determination is made whether the verification of the destination is valid to permit billing to that number. If not, at step 1008 the call is routed to a live operator. If at step 1006 the billing verification is valid, at step 1010 a billing record is created and stored, or routed elsewhere for storage. Execution then proceeds to step 1011 where the preference of the billable party is ascertained, and the call is routed according to those preferences. Step 1000 and step 1016 provide for the verification of either dialed number information or telephone calling card information. When either of these numbers are used for verification using a Line Information Data Base (LIDB 60A), the preferences of the billed party, including choices of carriers and operator services, as well as preferred telephone services can be ascertained. These preferences can then be utilized to automatically provide the customer with services to which they are accustomed. It is known that the originating local exchange carrier (LEC) is able to provide basic and enhanced services to a call, and thus may be selected by the caller as the preferred service provider. The caller may alternatively select as the preferred service provider any long distance carrier or service provider.

If at step 1000 the verification is not for a called number but is for a billing card number, execution proceeds to step 1014. At step 1014, the interface collects the digits of the card number. The interface 10 has the ability to identify the type of billing card by the numbering sequence, whether it be a local exchange carrier (LEC) calling card, a Card Issuer Identification Card (CIID) or a bank card, for example.

At step 1016, a determination is made whether the card is a LEC calling card. If so, at step 1030 the interface 10 accesses a data base for verification of the card number. If at step 1016 the card is not a LEC calling card, execution proceeds to step 1018. At step 1018, a determination is made whether the card is a CIID card. If not, at step 1020 a determination is made whether the card is a bank (VISA or MasterCard, for example) or American Express or other credit card. If so, execution proceeds to step 1030 for verification of the card number by access to a data base.

If at step 1018 the card is a CIID card, at step 1022 a prompt is issued to the caller offering additional savings over the selected carrier's rates upon entry of a MC/VISA card number. At step 1024, a determination is made whether a time period has expired waiting for an alternative card number. If so, at step 1026 the call is routed to the selected carrier. If, at step 1026, the call is routed to the selected carrier, it can be dialed as a 1+ number and the billing information is retained by the applications platform, or the call can be dialed as an 0+ number and the billing information is passed on to the selected carrier. If at step 1024 the time period has not expired, at step 1028 the interface receives the digits of the card and at step 1030 accesses a data base to verify the card number.

At step 1032 a determination is made whether the verification of the card number is valid. If so, at step 1034 a billing record is created and the record stored. If at step 1032 the verification results in a card number which is not valid, at step 1038 the call is routed to a live operator.

Figure 11:
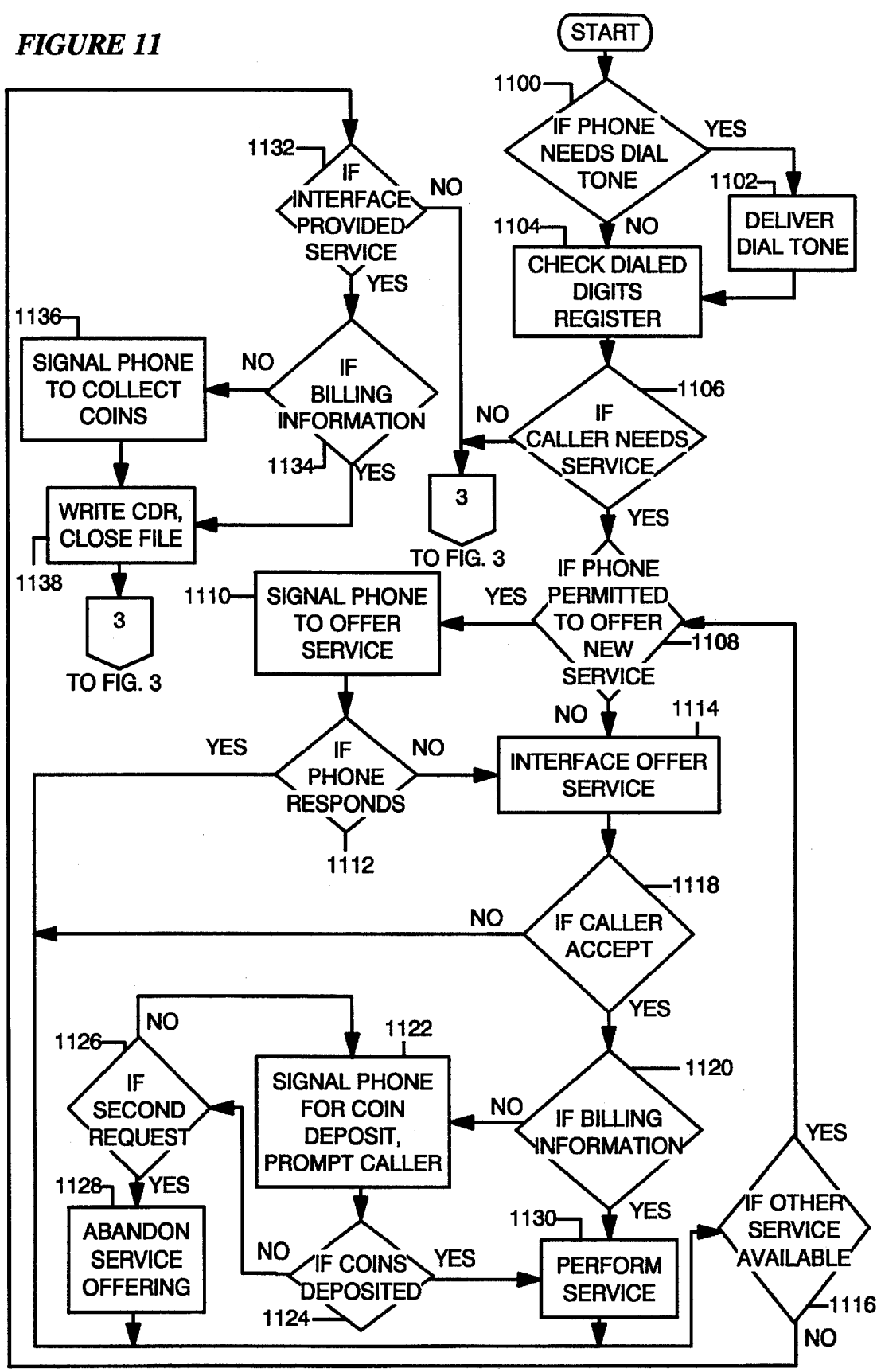
FIG. 11 is a flow chart diagram illustrating control logic implemented by the interface of FIG. 1 for performing intelligent paystation arbitration.

FIG. 11 illustrates a protocol for communications between the interface 10 and an intelligent paystation 12. At step 1100, after the paystation 12 has gone off hook, a determination is made whether the paystation 12 needs a dialtone provided for it by the interface 10, or whether it will generate its own dialtone. If it does not generate its own dialtone, at step 1102 the interface 10 generates the dialtone. If at step 1100 the paystation 12 generates its own dialtone, execution proceeds directly to step 1104. At step 1104, the interface 10 receives the dialed digits from the paystation 12. At step 1106, the call is monitored and a determination is made whether an enhanced call service can be provided to the caller. This determination is made based on the identity of the numbers dialed and the monitored status of the call progress, for example. For example, if an international number is called, the interface 10 can route the call to a special international carrier or enhanced service provider. If an enhanced service is not needed, execution returns to step 300 in FIG. 3.

If at step 1106 it is determined that an enhanced call service is able to be provided to the caller, at step 1108 a determination is made whether the intelligence of the paystation 12 is able to offer the service. If so, at step 1110 the interface 10 signals the paystation 12 to offer the service. If at step 1110 it is advantageous for the interface 10 to offer the service, the paystation 12 is signaled by the interface 10 that the interface 10 is taking control of the call whereupon the paystation 12 suspends its internal answer supervision. Without this suspension, the paystation 12 could see the action of the interface 10 as an answer by the called party and collect the caller's coin deposit or bill the caller's card.

At step 1112, a determination is made whether the paystation 12 responds to the signal to offer the service. If at step 1112 the paystation 12 does not offer the service, at step 1114 the interface 10 offers the service. If at step 1112 the paystation 12 does offer the service, after the service is offered by the paystation 12, execution proceeds to step 1116. At step 1116, a determination is made whether the another enhanced service can be offered to the caller. If so, execution returns to step 1110.

If at step 1108 the paystation 12 does not offer the service, at step 1114 the interface 10 offers the service. At step 1118, a determination is made whether the caller accepts the call service. If not, execution proceeds to step 1116 to determine if other services can be provided. If at step 1118 the caller does accept the service, a determination is made at step 1120 whether the interface 10 has the necessary billing information. If not, it may be obtained using the described alternative billing procedures. Alternatively, if at step 1120 the interface 10 does not have the necessary billing information, execution proceeds to step 1122. At step 1122 the interface 1122 signals the paystation 12 for coin deposit and prompts the caller to deposit coins. The interface 10 verifies the deposit at step 1124 by determining whether coins have been deposited. In the instance of a standard paystation 12, coin tones are generated by the paystation 12 and counted by the interface 10. In the instance of an intelligent paystation 12, the intelligent paystation 12 and the interface 10 cooperatively communicate to determine the charge for the service and the amount deposited. If at step 1124 coins have not been deposited, at step 1126 a determination is made whether the request for coin deposit is the second request. If so, at step 1128 the service is abandoned. If at step 1126 it is not the second request, execution returns to step 1122.

If at step 1124 the coins are deposited, or if at step 1120 the interface 10 has the billing information, execution proceeds to step 1130. At step 1130, the service is performed. Execution then proceeds to step 1116 to determine if another service can be offered. If not, at step 1132 a determination is made whether the interface 10 has provided the service. If not, execution returns to step 300 in FIG. 3. If so, at step 1134 a determination is made whether the interface 10 has the billing information. If not, at step 1136 the paystation 12 is signaled to collect coinage. If at step 1134 the interface 10 has the billing information, execution proceeds to step 1138. At step 1138, a call detail record is prepared and execution returns to step 300 in FIG. 3.

Figure 12:
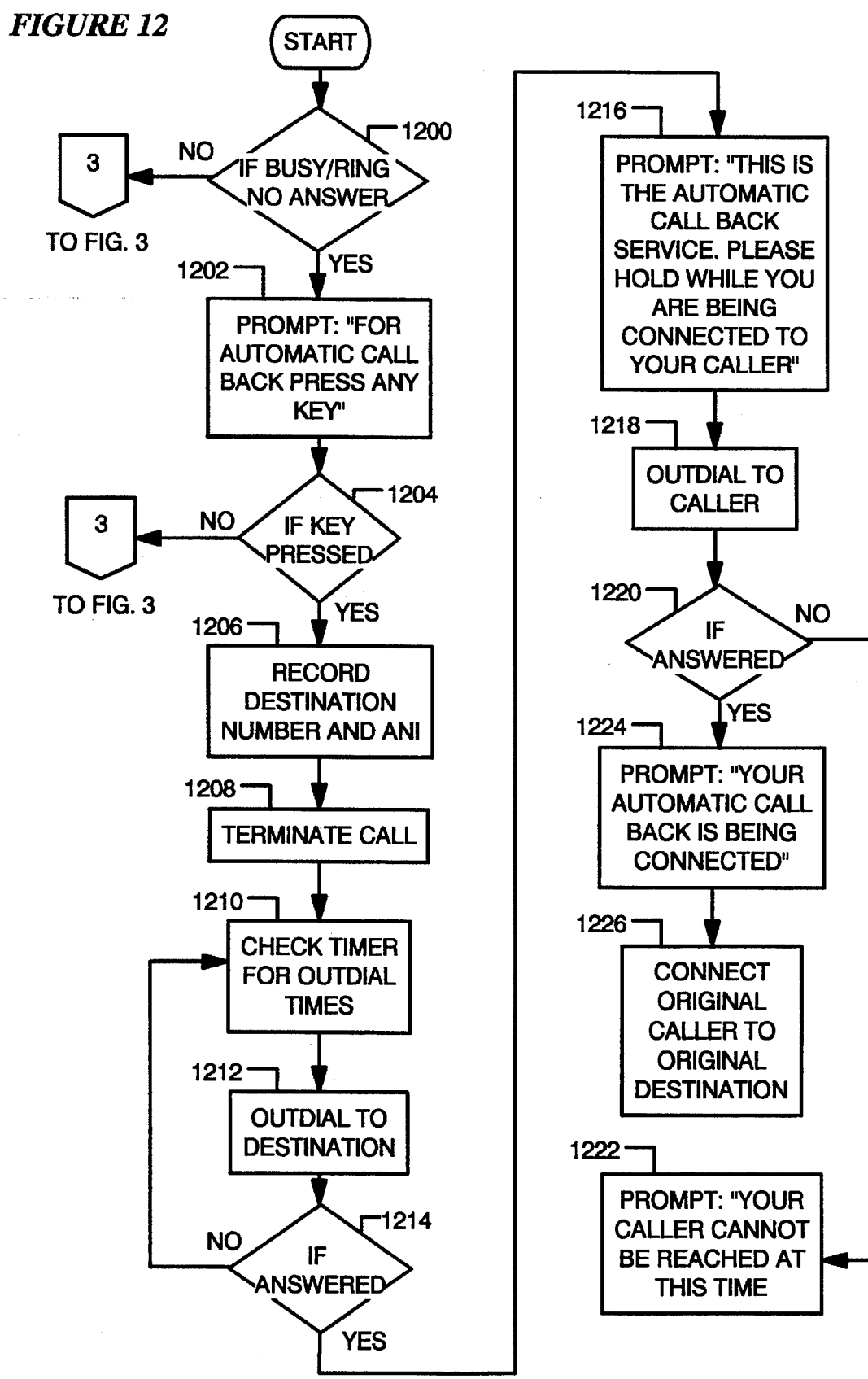
FIG. 12 is a flow chart diagram illustrating control logic implemented by the interface of FIG. 1 for performing automatic call back.

FIG. 12 illustrates control logic for performing automatic call back services. It is understood that a call from the paystation 12 is in progress. At step 1200 a determination is made whether a busy/ring no answer condition has been encountered. If not, execution proceeds to step 300 in FIG. 3. If the condition is encountered, execution proceeds to step 1202. At step 1202 a prompt is issued to the caller offering a secondary call completion option. For example, the option may be either automatic message delivery or automatic call back. For purposes of this example, the option described is automatic call back. At step 1204 a determination is made whether the caller requested the automatic call back option. If not, execution proceeds to step 300 in FIG. 3. If the option is selected, at step 1206 the destination number and the calling number are recorded. At step 1208 the call is terminated. At step 1210 a timer is initialized to run for a predetermined period of time. Upon completion of the time period, at step 1212 the destination number is outdialed by the interface 10. At step 1214 a determination is made whether the call is answered. If not, execution returns to step 1210. If the call is answered, execution proceeds to step 1216. At step 1216 a prompt is issued to the called party informing the called party of the automatic call back service and requesting the called party to stay on the line, while the they are connected to the original caller. At step 1218, the original caller is called back by the interface 10. At step 1220 a determination is made whether the original caller has answered the returned call. If not, at step 1222 a prompt is issued to the original called party informing him that the original caller cannot be reached at this time. It is understood that execution can return to step 1202 to enable the original called party to invoke the automatic call back feature. It is also understood that after step 1222 execution can return to step 1210 to enable the automatic call back to be reactivated.

Figure 13:
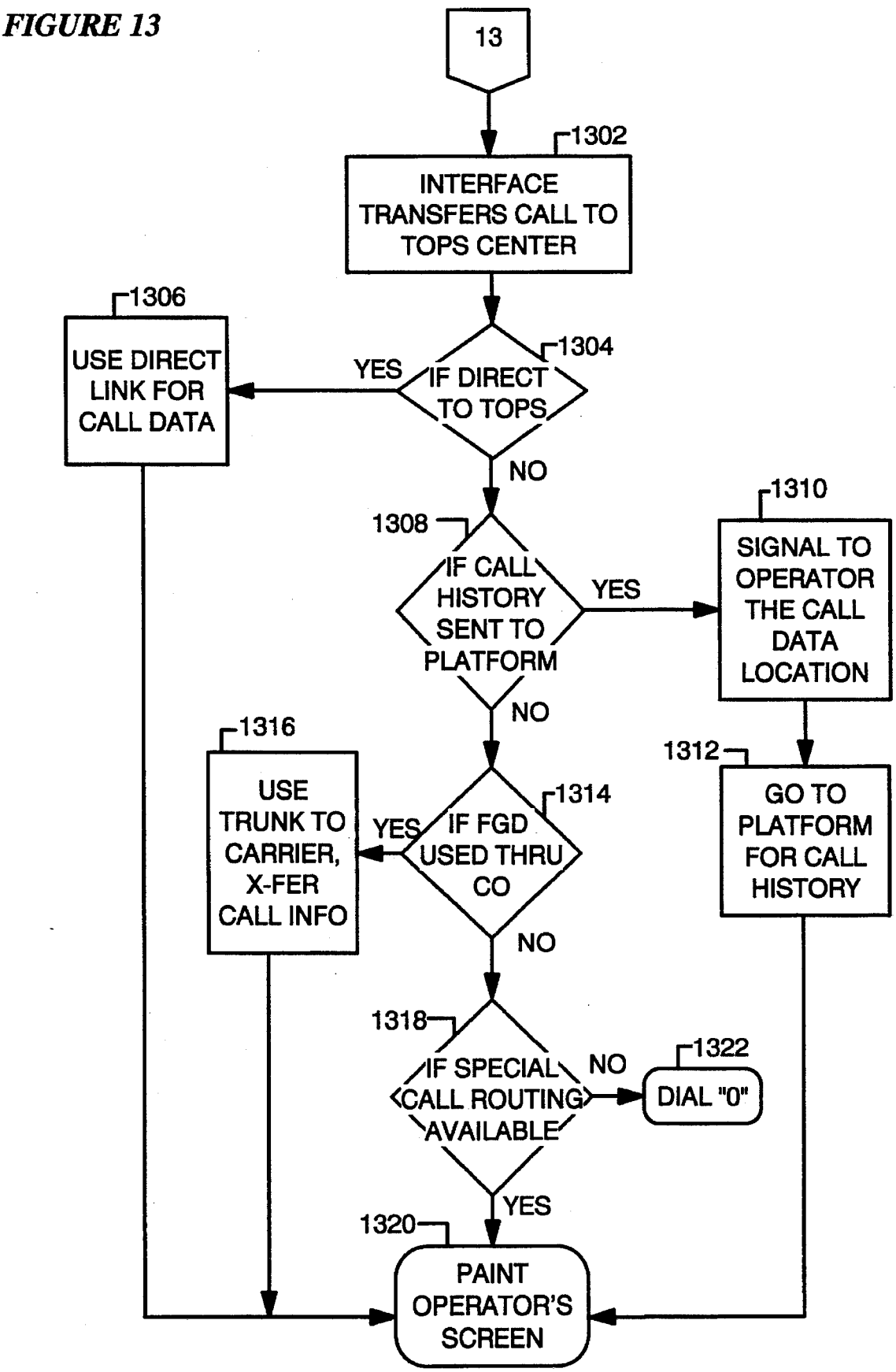
FIG. 13 is a flow chart diagram illustrating control logic implemented by the interface and the application platform for performing call routing to a live operator.

FIG. 13, illustrates control logic for routing calls to an operator for assistance.

It is understood that a call is in process, and either the caller has requested a live operator, or the interface 10 has determined that the caller needs live operator assistance. Because the interface 10 has attempted to automate the operator assistance, it has acquired some caller information and call history that could be advantageously employed by the live operator. This information could include type of call, billing, credit or calling card information in either complete or partial form, or other information which may be useful to the operator to expedite the call handling. Transferring this call data to the operator can reduce the operator assistance time, as well as the inconvenience to the caller.

At step 1302, the interface 10 begins the transfer of the call to a live operator, hereinafter referred to as a Traffic Operator Position System (TOPS 62). This transfer can be made according to the type of link available to the TOPS 62. At step 1304, a determination is made whether the interface 10 has a direct link to the TOPS 62. If a direct link is available, execution proceeds to step 1306 wherein the direct link is used to transmit the call data to the TOPS 62. In an area of high concentration of interfaces, a direct link is advantageously provided. This link is a digital T-1 link although, alternatively, an analog data link can be provided. The call data is transmitted via the direct link, and, if at step 1304, a determination is made that there is not a direct link to the TOPS, execution proceeds to step 1308. In step 1308, a determination is made whether the call data should be transferred to the AP 28. This determination is based on the ability of the TOPS 62 to effect a direct connection to the AP 28. If a determination is made to transfer the call data to the AP 28, execution proceeds to step 1310. At step 1310, the call data is transferred to the AP 28 via a digital data link, the interface 10 transfers the call to the TOPS 62 and supplies an address signal as part of the header information. This address can be in the form of a number transmitted directly to the operator's screen, a DTMF or MF signal or, alternatively, as a voice prompt from the interface 10. The address is the location of the call data associated with the call coming in to the operator behind this particular call header. At step 1312, as the operator is connecting to the caller, the operator keys in the address information provided in the header information. Execution then proceeds to step 1320, wherein the AP 28 transmits the associated call data directly to the operator screen. If, at step 1308, a determination is made that the call data cannot be sent to the AP 28, execution proceeds to step 1314 wherein a determination is made whether the TOPS 62 can be reached using Feature Group D. At step 1316 affirmative decision is reached at this step when there are no other options available. If Feature Group D is used to route the call through the central office 16 to the TOPS 62, provided that the interface has gathered enough information to determine the carrier chosen by the caller, the interface can select a trunk designated for that specific carrier. If, at step 1314, a determination is made that Feature Group D is not used to reach the TOPS 62, execution proceeds to step 1318 wherein a determination is made whether special call routing is available. If an affirmative decision is reached at step 1318, the call is directed to the TOPS 62 via specific trunks through the central office 16. These trunks are designed to carry additional information about the call set up to the TOPS 62, as defined in the Bellcore Operator Services Systems Generic Requirements (OSSGR), Bellcore document No. FR-NWT-000271. The OSSGR—defined communications protocol allows for the identification of trunks, inbound to the TOPS 62, when calls are directed to the TOPS 62. Using this protocol, the trunks can be identified as a specified type which transmit additional information to the operator. One set of information on these trunks is a two-digit "call type" field indicating the equipment which originates the call (i.e., a paystation, residential phone, hotel phone or the like). This call type field can be advantageously used by the interface 10 to signal the TOPS 62 that information about the call in process is available. The interface 10 is used to modify the call type field and the modified field is used as an indicator, causing the TOPS 62 to automatically go to a special data base, which can be maintained in the AP 28, to request information on the originating paystation 12 number, and to retrieve the information from the date base and display it on the operator's screen. This special data base can contain a variety of information such as previous call detail records, current call detail records, previous attempts at calling card input, and previous attempts at calling collect or person-to-person, for example. This automated transfer from a data base to the operator's screen allows the operator to have access to information heretofore unavailable manually, much less in an automatic, real time fashion. Because this information can include information about he activity of the call in process and the activity of previous calls on the same line 30, the operator is able to immediately assist callers who have misdialed and callers who need credit for coin calls or refunds to their debit cards.

For example, the operator, seeing a two (2) dollar charge on a debit card for a fifteen (15) second call, could key information into the AP 28 with link 50 in place. The AP 28 would then send information to the interface 10 which would instruct the card reader 12A to re-increment the debit card.

The AP 28, in conjunction with the interface 10, maintains records of call attempts and can modify the call type any time there appears to be inappropriate call activity, such as a third or fourth attempt by a caller or "hacker" to determine the personal identification number (PIN) associated with a calling card. This activity, and the attempted call in process, can be transferred to a live operator for security.

Execution then proceeds to step 1320 wherein the call data is transferred to the operator's screen. If, at step 1318, a determination is made that no special routing is available, the interface transfers the caller to the operator in the same fashion as has always been used, by dialing "0", at step 1322 This connects the caller to the operator without the benefit of any call data on the transaction history.

It is understood that variations may be made in the present invention without departing from the spirit and scope of the invention. For example, the interface may be utilized in conjunction with one or more enhanced service provider applications platforms wherein the services are provided in either the interface or the platform, or by both the interface and the platform. Likewise, basic and enhanced services can be provided by the interface in conjunction with the paystation wherein services may be provided jointly at either or both locations, or independently. In some instances, the technology necessary to provide the previously explained services can reside entirely in a smart paystation. Many aspects of the invention may be placed within a smart paystation or alternatively may be placed adjacent to a central office switch. Further, the interface is operable in connection with an originating call station other than a paystation. For example, the interface can be added to an individual residential telephone line. One such applications platform provided for a residence is a local cable television company. When thus connected, using a high speed data communications protocol, the programming of the cable company is delivered to the home over the existing phone line. The architecture provided by the interface can further be operable in providing debit card and maintenance services to a number of similarly located devices, such as parking meters and subway gates, using standard twisted-pair phone wire with tip and ring lines, or wire lines including tip, ring and ground.

Although illustrative embodiments of the invention have been shown and described, a latitude of modification, change and substitution is intended in the foregoing disclosure, and in certain instances some features of the invention will be employed without a corresponding use of other features. Accordingly, it is appropriate that the appended claims be construed broadly and in a manner consistent with the scope of the invention.

What is claimed is:

1. An apparatus for connection between more than one card readers and an application platform for providing data connections between said more than one card readers and said application platform, the apparatus comprising:

an interface connected to individual communication lines, said individual communication lines connected to each of the said more than one card readers;

said interface further connectable to a first communications link, said first communications link connectable to an application platform, the interface further comprising;

a communication circuit connectable to each of said individual communication lines for transmitting and receiving data to or from said more than one card readers on said individual communication lines; and a multiplexer connectable to said first communications link for multiplexing said data of said more than one card readers to or from said application platform on said first communications link.

2. The apparatus of claim 1 wherein said communications link is a dedicated data link.

3. The apparatus of claim 1 wherein said communications link is provided by a high-speed modem on a voice-grade telecommunications line.

4. The apparatus of claim 1 wherein said more than one card readers will read a multiplicity of credit or debit card types.

5. The apparatus of claim 4 further comprising:

determining means for determining the specific type of bank, debit or commercial credit card used in said more than one card readers, and a second communications link for connecting said application platform to a billing validation system associated with the determined card type.

6. Apparatus for connection between a calling station and an originating central office switch in a telecommunication circuit for selectively directing calls to at least one preferred service provider, the apparatus comprising:

means connected to said telecommunication circuit for monitoring said telecommunication circuit for signals from said calling station;

means responsive to receipt of said signals for obtaining payment information from said calling station;

means for determining the preferred service provider from said payment information;

means for verifying said payment information and selectively directing one of said calls to said at least one preferred service provider to bypass said originating central office "0" call functions.

7. The apparatus of claim 6 wherein said determination of the preferred service provider is made based upon the numbering format of said payment information.

8. The apparatus of claim 6 wherein said determination of the preferred service provider is made based upon information received from a remote data base connected to said telecommunication circuit.

9. The apparatus of claim 8 wherein said remote database is a line information data base.

10. The apparatus of claim 6 wherein said preferred service provider is an interexchange carrier for the provision of long distance call services.

11. The apparatus of claim 6 wherein said preferred service provider is an enhanced call service provider.

12. The apparatus of claim 11 further comprising:
means for providing enhanced call services to said calling station.

13. Apparatus for connection between a calling station and an originating central office switch in a telecommunication circuit including at least one database for storing service provider preference information, the apparatus for selectively directing calls to at least one preferred service provider, the apparatus comprising:
an interface circuit including means connected to said telecommunication circuit for monitoring said telecommunication circuit for signals from said calling station; means responsive to receipt of said signals for obtaining payment information from said calling station; means for determining the preferred service provider from said payment information; and means for verifying said payment information and selectively directing one of said calls to said at least one preferred service provider; and
an applications platform circuit connected to said interface circuit for communicating with said at least one data base and sending said payment information to said data base and for receiving from said data base validation of billing information, said billing information further including the identity of said preferred service provider.

14. The apparatus of claim 13 wherein said database is a remote data base.

15. The apparatus of claim 14 wherein said remote database is a line information data base.

16. The apparatus of claim 13 wherein said database is connected in proximity to said applications platform circuit.

17. The apparatus of claim 13 wherein said preferred service provider is the local exchange carrier for the calling party.

18. The apparatus of claim 13 wherein said preferred service provider is an enhanced call service provider.

19. A method for intercepting call signals transmitted between a calling station and an originating central office switch in a telecommunication circuit for selectively directing calls to at least one preferred service provider, the method comprising:
monitoring said telecommunication circuit for signals from said calling station;
obtaining payment information from said calling station;
determining the preferred service provider from said payment information;
verifying said payment information; and
selectively directing one of said calls to said at least one preferred service provider to bypass said originating central office "0" call functions.

20. The method of claim 19 wherein said determination of the preferred service provider is made based upon the numbering format of said payment information.

21. The method of claim 19 wherein said determination of the preferred service provider is made based upon information received from a remote data base connected to said telecommunication circuit.

22. The method of claim 21 wherein said remote database is a line information data base.

23. The method of claim 19 wherein said preferred service provider is an interexchange carrier for the provision of long distance call services.

24. The method of claim 19 wherein said preferred service provider is an enhanced call service provider.

25. A method for selectively directing calls to at least one preferred service provider by intercepting call signals transmitted between a calling station and an originating central office switch in a telecommunication circuit, the circuit including at least one database for storing service provider preference information, the method comprising:
monitoring said telecommunication circuit for signals from said calling station;
obtaining payment information from said calling station responsive to receipt of said signals
determining the preferred service provider from said payment information;
verifying said payment information by sending said payment information to said data base and receiving from said data base validation of billing information, said billing information further including the identity of said at least one preferred service provider; and
selectively directing one of said calls to said at least one preferred service provider.

26. The method of claim 25 wherein said database is a remote data base.

27. The method of claim 26 wherein said remote database is a line information data base.

28. The method of claim 25 wherein said database is connected in proximity to said applications platform circuit.

29. The method of claim 25 wherein said preferred service provider is the local exchange carrier for the calling party.

30. The method of claim 25 wherein said preferred service provider is an enhanced call service provider.

31. Apparatus for connection between at least one calling station and an originating central office switch in a telecommunication circuit, the apparatus for providing data communications with an applications platform, the apparatus comprising;
an interface circuit including means connected to said telecommunication circuit for monitoring said telecommunication circuit for signals from any of said at least one calling station;
means responsive to receipt of said signals for communicating said signals with said applications platform;
a communication circuit for transferring communications between said interface circuit and said applications platform wherein said applications platform monitors or controls the operation of said interface circuit.

32. The apparatus of claim 31 wherein said communication circuit is provided by a direct connection of a digital data link.

33. The apparatus of claim 31 wherein said communication circuit is provided by a high-speed modem on a standard voice-grade telephone line.

34. The apparatus of claim 31 further providing additional data communications between said interface circuit and said calling station.

35. The apparatus of claim 34 further comprising a modem in said telecommunication circuit wherein said additional data communications are provided over the voice signals.

* * * * *